United States Patent
Kawashiri

(10) Patent No.: US 7,721,866 B2
(45) Date of Patent: May 25, 2010

(54) TRAVELING OPERATION DEVICE AND WORKING VEHICLE

(75) Inventor: Shinya Kawashiri, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 588 days.

(21) Appl. No.: 11/574,670

(22) PCT Filed: Aug. 17, 2005

(86) PCT No.: PCT/JP2005/015003

§ 371 (c)(1),
(2), (4) Date: Mar. 2, 2007

(87) PCT Pub. No.: WO2006/027940

PCT Pub. Date: Mar. 16, 2006

(65) Prior Publication Data

US 2008/0092688 A1    Apr. 24, 2008

(30) Foreign Application Priority Data

Sep. 3, 2004   (JP)   ............................. 2004-256774
Sep. 3, 2004   (JP)   ............................. 2004-256803
Sep. 10, 2004  (JP)   ............................. 2004-263957

(51) Int. Cl.
*G05G 1/30*   (2008.04)
*B60W 10/10*  (2006.01)
*B60W 10/18*  (2006.01)

(52) U.S. Cl. ...................... 192/220.1; 74/478
(58) Field of Classification Search ............... 192/220.1
See application file for complete search history.

(56) References Cited

U.S. PATENT DOCUMENTS 3,868,003 A * 2/1975 Smith ...................... 192/220.1
4,496,035 A * 1/1985 Wanie ...................... 192/220.1

FOREIGN PATENT DOCUMENTS

| JP | 2-15658   | 1/1990  |
| JP | 7-323762  | 12/1995 |
| JP | 10-247119 | 9/1998  |
| JP | 11-310159 | 11/1999 |

OTHER PUBLICATIONS

English Language Translation of International Search Report for International Application Serial No. PCT/JP2005/015003, Japanese Patent Office mailed Nov. 22, 2005, 3 pages.

* cited by examiner

*Primary Examiner*—Rodney H Bonck
(74) *Attorney, Agent, or Firm*—Sterne, Kessler, Goldstein & Fox P.L.L.C.

(57) ABSTRACT

The present invention provides a traveling operation device that is configured so that the speed-change lock mechanism shifts from the speed-change locked state to the unlocked state when the brake operation mechanism is operated. The present invention also provides a traveling operation device including a forward-side speed-change pedal and a rearward-side speed-change pedal for operating a traveling stepless speed-change device provided in a working vehicle, wherein the forward-side speed-change pedal and the rearward-side speed-change pedal are arranged spaced apart in a vehicle width direction so as to define a footrest region in between at one of left and right step boards in the working vehicle. The present invention also provides a working vehicle in which the driver's seat is exposed and which includes supporting members for supporting a pair of left and right mud-shield foot-guards arranged on a front side with the driver's seat as a reference and a width indicator lamp detachable mounted to at least one of the pair of left and right foot-guard supporting members so that a light-emitting portion of the width indicator lamp faces forward.

8 Claims, 17 Drawing Sheets

TRAVELING OPERATION DEVICE AND WORKING VEHICLE

BACKGROUND OF THE INVENTION

1. Field of the Invention

The present invention relates to a traveling operation device including a speed-change operation mechanism for operating a stepless speed-change device, the speed-change operation mechanism being biased toward a neutral side, a speed-change lock mechanism that is manually operational to take a speed-change locked state for holding the speed-change operation mechanism at an voluntary speed-change position and an unlocked state of releasing the speed-change locked state, and a brake operation mechanism for operating a traveling brake device; a traveling operation device including a forward-side speed-change pedal and a rearward-side speed-change pedal for operating the traveling stepless speed-change device provided in a working vehicle; and a working vehicle in which a driver's seat is exposed.

2. Background of the Art

The traveling operation device including a speed-change operation mechanism for operating a stepless speed-change device, the speed-change operation mechanism being biased toward the neutral side; a speed-change lock mechanism that is manually operational to take a speed-change locked state for holding the speed-change operation mechanism at a voluntary speed-change position and an unlocked state of releasing the speed-change locked state; and a brake operation mechanism for operating a traveling brake device; the traveling operation device being configured so that the speed-change lock mechanism shifts from the speed-change locked state to the unlocked state by operation of another operation mechanism (e.g., press-down operation of a master brake pedal of a master brake operation mechanism including a pair of left and right brake pedals and the master brake pedal for simultaneously operating the pair of left and right brake pedals) arranged separately from the brake operation mechanism is conventionally known (see e.g., Japanese Laid-Open Patent Publication No. 10-247119).

However, in the traveling operation device disclosed in Japanese Laid-Open Patent Publication No. 10-247119, the speed-change locked state of the speed-change lock mechanism cannot be released other than by the operation mechanism provided separately from the brake operation mechanism, and the locked state cannot be released even by performing the press-down operation of the brake pedal in the brake operation mechanism when the speed-change lock mechanism is in the speed-change locked state.

Furthermore, in a traveling operation device including a forward-side speed-change pedal and a rearward-side speed-change pedal for operating a traveling stepless speed-change device in the working vehicle, if both of the forward-side and rearward-side speed-change pedals are arranged on one of either left or right step board of the working vehicle, it is difficult to secure a large space for placing a driver's foot on the step board on the one side, resulting in tending to deteriorate ride-on/off efficiency. Further, if operation members such as various operation levers are arranged on the step board on the one side, it becomes more difficult to secure the large space for placing the foot, resulting in lowering operationality.

There are working vehicles of one type (so-called working vehicle of no-cabin type) in which the driver's seat is exposed and working vehicles of another type (so-called working vehicle of cabin specification) in which a cabin enclosing the periphery of the driver's seat is provided. There has been proposed working vehicles including width indicator lamps for indicating a width of the vehicle by means of a light from a light-emitting portion and direction indicator lamps for indicating the left and right moving direction of the vehicle by means of the light from the light-emitting portion.

The conventional working vehicle in which the driver's seat is exposed and in which the width indicator lamp and the direction indicator lamp are provided is configured so that the width indicator lamp and the direction indicator lamp are arranged on the rear side with the driver's seat as a reference in a state where the light emitting portions thereof face forward (see Japanese Laid-Open Patent Publication No. 11-310159).

However, when a third person looks at the conventional working vehicle from the front or from the side with a distance, the lights from the width indicator lamp and the direction indicator lamp that are arranged on the rear side of the driver's seat in such a manner that the light emitting portions face forward are shielded by the driver or the vehicle main body. Consequently, it may be difficult for the third person to visibly recognize the light, and thus visibility of the third person with respect to the working vehicle tends to lower. Furthermore, for the driver, since the lights from the width indicator lamp and the direction indicator lamp arranged on the rear side of the vehicle with the driver's seat as the reference in such a manner that the light emitting portions face forward are irradiated from rearward to forward with the driver's seat as the reference, the light easily enters the eyes of the driver, in particular, the light appears bright for the driver if the width indicator lamp and the direction indicator lamp are arranged near the height of the eyes of the driver, whereby the rearward view of the driver (e.g., view in a case where the driver steers the working vehicle while looking rearward) tends to lower.

SUMMARY OF THE INVENTION

In view of the conventional art, it is a first object of the present invention to provide a traveling operation device including a speed-change operation mechanism for operating a stepless speed-change device, the speed-change operation mechanism being biased toward a neutral side; a speed-change lock mechanism capable of being manually operated so as to take a speed-change locked state of holding the speed-change operation mechanism at a voluntary speed-change position and an unlocked state of releasing the speed-change locked state; and a brake operation mechanism for operating a traveling brake device, wherein the traveling operation device is capable of releasing the speed-change locked state according to an operation of the brake operation mechanism in a state where the speed-change lock mechanism is in the speed-change locked state, without providing another operation mechanism separately from the brake operation mechanism.

It is a second object of the present invention to provide a traveling operation device including a forward-side speed-change pedal and a rearward-side speed-change pedal for operating the traveling stepless speed-change device provided in a working vehicle, the forward-side speed-change pedal and the rearward-side speed-change pedal both being arranged on one of either a left or right step board in the working vehicle, wherein the traveling operation device is capable of securing a relatively large space for placing a foot on the one step board, thereby improving ride-on/off efficiency, and achieving satisfactory operationality, for example, even in a case where operation members such as various operation levers are arranged on the one step board.

It is a third object of the present invention to provide a working vehicle in which the driver's seat is exposed, wherein the working vehicle is capable of enhancing visibility against the working vehicle by a third person when the third person sees the working vehicle from a front side or from a lateral side with a distance, and rearward visibility of the driver.

The present invention provides, in order to achieve the first object, a first traveling operation device including a speed-change operation mechanism for operating a stepless speed-change device, the speed-change operation mechanism being biased toward a neutral side; a speed-change lock mechanism capable of being manually operated so as to take a speed-change locked state of holding the speed-change operation mechanism at a voluntary speed-change position and an unlocked state of releasing the speed-change locked state; and a brake operation mechanism for operating a traveling brake device; wherein the speed-change lock mechanism shifts from the speed-change locked state to the unlocked state according to the operation of the brake operation mechanism.

The stepless speed-change device operated by the speed-change operation mechanism may be, for example, an HST (Hydrostatic Transmission), an HMT (Hydro Mechanical Transmission), belt type speed change device and the like.

In the first traveling operation device according to the present invention, when the brake operation mechanism is operated, the speed-change lock mechanism shifts from the speed-change locked state to the unlocked state. Consequently, it is possible to release the unlocked state of the speed-change lock mechanism by operating the brake operation mechanism in a state where the speed-change lock mechanism is in the unlocked state, without providing another operation mechanism separately from the brake operation mechanism.

As described above, the first traveling operation device according to the present invention is configured so that the speed-change lock mechanism shifts from the speed-change locked state to the unlocked state according to the operation of the brake operation mechanism. However, the first traveling operation device could be configured so that the speed-change lock mechanism shifts from the speed-change locked state to the unlocked state according to the operation of the speed-change lock mechanism or the speed-change operation mechanism, in addition to the configuration.

The first traveling operation device according to the present invention may have, for example, a following specified configuration.

The speed-change operation mechanism includes: a speed-change pedal shaft capable of being rotated about an axis line; a forward-side speed-change pedal that is relatively non-rotatable with respect to the pedal shaft, the forward-side speed-change pedal rotating the pedal shaft about the axis line based on a manual operation; a ratchet body that rotates about the axis line substantially parallel to the pedal shaft (including a configuration where the ratchet body swings about the pedal shaft) according to the rotation of the pedal shaft about the axis line, the ratchet body including a plurality of teeth; and a neutral biasing mechanism for operatively biasing the pedal shaft toward the neutral side. The speed-change lock mechanism includes: a lock member including a lock claw that selectively engages the plurality of teeth of the ratchet body, the lock member capable of being rotated about a first pivot shaft substantially parallel to the pedal shaft so as to take a locked position where the lock claw engages the teeth and an unlocked position where the lock claw is separate from the teeth; a lock operation member capable of being manually operated so as to position the lock member at the locked position or the unlocked position; and an unlock biasing member for operatively holding the lock member at the unlocked position. The brake operation mechanism includes: a brake operation shaft arranged substantially parallel to the first pivot shaft, the brake operation shaft capable of being rotated about the axis line to take a brake-actuated position of actuating the traveling brake device and a brake-released position of releasing the brake actuation of the traveling brake device; a brake operation member capable of being manually operated so as to selectively position the brake operation shaft at the brake-actuated position or the brake-released position; and a brake-releasing biasing member for operatively biasing the brake operation shaft toward the brake-released position. The brake operation shaft includes an engaging portion that contacts the lock member to move the lock member from the locked position to the unlocked position when the brake operation shaft moves from the brake-released position to the brake-actuated position.

In the specified configuration of the first traveling operation device, the speed-change pedal shaft 110 of the speed-change operation mechanism is constantly biased toward the neutral side by the neutral biasing mechanism. When a manual operation toward the forward direction is performed on the forward-side speed-change pedal with the pedal shaft biased toward the neutral side, the pedal shaft rotates about the axis line toward the forward side, and the ratchet body rotates to the forward side about the pedal shaft or the axis line substantially parallel to the pedal shaft according to the rotation about the axis line of the pedal shaft therewith. In this case, the pedal shaft is constantly biased toward the neutral side from the forward side, and therefore, attempts to return to the neutral side when the manual operation toward the forward side on the forward-side speed-change pedal is released, but is held at the speed-change locked state at a voluntary speed-change position by the speed-change lock mechanism, depending on needs.

That is, in the speed-change lock mechanism, the lock member is constantly held at the released position by the coil spring. When the lock member rotates about the first pivot shaft to be positioned at the locked position from the released position based on the manual operation toward the locked position on the lock operation member, the lock claw engages the teeth of the ratchet body while the lock member is being biased toward the released position by the coil spring. The speed-change operation mechanism is thereby in the speed-change locked state of being held at the voluntary speed-change position.

On the other hand, in the brake operation mechanism, the brake operation shaft is constantly biased toward the brake-released position by the brake-releasing biasing member. When the brake operation member is manually operated to the brake-actuated position while the brake operation shaft is biased toward the brake-released position, the brake operation shaft rotates about the axis line toward the brake-actuated position according to the manual operation on the brake operation member. If the speed-change lock mechanism is in the speed-change locked state at this time, the engaging portion contacts the lock member when the brake operation shaft moves from the brake-released position to the brake-actuated position, whereby the lock member moves from the locked position to the unlocked position. Consequently, the speed-change locked state of the speed-change lock mechanism is released.

As described above, the specified configuration of the first traveling operation device is configured so that the speed-change lock mechanism shifts from the speed-change locked state to the unlocked state when the brake operation mechanism is operated. Consequently, it is possible to release the unlocked state of the speed-change lock mechanism by operating the brake operation mechanism in a state where the speed-change lock mechanism is in the unlocked state, without providing another operation mechanism separately from the brake operation mechanism.

The specified configuration of the first traveling operation device may be configured so that the speed-change lock mechanism shifts from the speed-change locked state to the unlocked state according to the operation of the speed-change lock mechanism or the speed-change operation mechanism, in addition to the configuration. In other words, the speed-change locked state could be released by the operation of the speed-change lock mechanism or the operation of the speed-change operation mechanism, in addition to the configuration.

Specifically, a case where the speed-change locked state is released by the operation of the speed-change lock mechanism will be explained. When the lock operation member is manually operated to the unlocked position, the lock member rotates about the first pivot shaft so as to be positioned at the unlocked position in conjunction with the manual operation on the lock operation member. The engagement of the lock claw of the lock member with respect to the teeth of the ratchet body is thereby released, so that the pedal shaft that is biased toward the neutral side is rotated about the axis line toward the neutral side, and the forward-side speed-change pedal is returned to the neutral position therewith. The speed-change locked state of the speed-change lock mechanism is thereby released. A case where the speed-change locked state is released by the operation of the speed-change operation mechanism will be explained. When the forward-side speed-change pedal is manually operated to move toward the forward side, the pedal shaft rotates about the axis line toward the forward side, and the ratchet body rotates toward the forward side about the pedal shaft or the axis line substantially parallel to the pedal shaft in conjunction with the rotation of the pedal shaft. At this time, since the lock member is biased toward the unlocked position by the unlock biasing member, the engagement of the lock claw of the lock member with respect to the teeth of the ratchet body is released by the rotation of the ratchet body toward the forward side. When the manual operation toward the forward side on the forward-side speed-change pedal is stopped in this state, the forward-side speed-change pedal is returned to the neutral position. The speed-change locked state of the speed-change lock mechanism is thereby released.

In the specified configuration of the first traveling operation device, preferably, the lock member may include a center portion supported by the first pivot shaft in a rotatable manner about the axis line, and a first arm portion extending from the center portion toward the ratchet body and including the lock claw. The plurality of teeth may be arranged along a virtual circular arc having the pedal shaft as a center when seen along the axis line of the pedal shaft. And, the first arm portion may lie along a tangential direction with respect to the virtual circular arc. With the configuration, the plurality of teeth of the ratchet body are rotated along the virtual circular arc, and the lock claw at the first arm portion, which extends along the tangential direction with respect to the virtual circular arc, could engage the plurality of teeth of the ratchet body rotated along the virtual circular arc. In the preferred configuration, the lock member may include a second arm portion extending toward a side opposite the first arm portion with the center portion in between; and the engaging portion of the brake operation shaft is configured to engage the second arm portion.

In the specified configuration of the first traveling operation device, in a case where the lock member includes the first arm portion, the plurality of teeth are arranged along the virtual circular arc, and the first arm portion extends along the tangential direction with respect to the virtual circular arc, following configuration is preferably provided. That is, the tooth of the ratchet body includes a tooth-side first contacting surface that contacts the lock claw when the ratchet body is biased toward the neutral side by a biasing force of the neutral biasing mechanism, and a tooth-side second contacting surface that contacts the lock claw when the ratchet body is rotated toward an forward side against the biasing force of the neutral biasing mechanism by the manual operation on the forward-side speed-change pedal. The lock claw includes a claw-side first contacting surface and a claw-side second contacting surface respectively corresponding to the tooth-side first contacting surface and the tooth-side second contacting surface of the tooth of the ratchet body. The tooth-side first contacting surface lies in a radial direction with the pedal shaft as a reference, and the tooth-side second contacting surface is arranged so as to be away from the first contacting surface a extending radially outward with the pedal shaft as the reference.

In the configuration with the tooth-side and the claw-side contacting surfaces, in an engagement motion in which the lock claw of the first arm portion extending along the tangential direction with respect to the virtual circular arc engage the plurality of teeth, which are rotated along the virtual circular arc, of the ratchet body by the biasing force of the neutral biasing mechanism for biasing the ratchet body toward the neutral side when the speed-change lock mechanism is in the speed-change locked state, the tooth-side first contacting surface of the ratchet body contacts the claw-side first contacting surface of the lock claw. At this time, the lock claw of the lock member biased toward the released position by the unlock biasing member attempts to rotate in the direction of moving away from the ratchet body about the first pivot shaft, but since the plurality of teeth of the ratchet body biased toward the neutral side are arranged along the virtual circular arc, the lock claw at the first arm portion lies along the tangential direction with respect to the virtual circular arc, and the tooth-side first contacting surface is formed in the radial direction with the pedal shaft as the reference, force along the tangential direction is acted from the tooth-side first contacting surface to the claw-side first contacting surface in a time when the tooth-side first contacting surface is contacting with the claw-side first contacting surface, whereby the lock member is held at the locked position. When the brake operation shaft is rotated from the brake-released position to the brake-actuated position, the lock member shifts rotates around the first pivot shaft toward the unlocked position to move away from the ratchet body in conjunction with the rotation of the brake operation shaft. Then, the speed-change locked state is released.

In a case where the speed-change locked state is released by the operation of the speed-change lock mechanism other than the operation of the brake operation mechanism, when the lock member is shifting from the locked position to the unlocked position, the claw-side first contacting surface moves away from the tooth-side first contacting surface, and thereby the pedal shaft that is biased to the neutral side rotates about the axis line toward the neutral side, and the forward-side speed-change pedal is returned to the neutral position. As described manner, the speed-change locked state of the speed-change lock mechanism is released. In a case where the speed-change locked state is released by the operation of the speed-change operation mechanism, the components act as follows. Since the plurality of teeth of the ratchet body biased toward the neutral side are arranged along the virtual circular arc, the lock claw at the first arm portion lies along the tangential direction with respect to the virtual circular arc, and the tooth-side second contacting surface is formed so as to be away from the tooth-side first contacting surface as extending radially outward with the pedal shaft as the reference, the tooth-side first contacting surface moves away from the claw-side first contacting surface when the forward-side speed-change pedal moves from the neutral side toward the forward side. Therefore, the lock member rotate about the first pivot shaft to move to the unlocked position by the biasing force of the unlock biasing member or the pushing force against the claw-side second contacting surface by the tooth-side second contacting surface along with the biasing force of the unlock biasing member, and moves away from the ratchet body. When the manual operation toward the forward side on the forward-side speed-change pedal is stopped in this state, the forward-side speed-change pedal is returned to the neutral position by the neutral biasing mechanism. Then, the speed-change locked state of the speed-change lock mechanism is released.

In the configuration with the tooth-side and the claw-side contacting surfaces, the teeth and the lock claw are preferably configured so as to form a space between the respective second contacting surfaces when the respective first contacting surfaces contact to each other. With the configuration, it is possible to easily move the claw-side first contacting surface away from the tooth-side first contacting surface when the engagement of the lock claw of the lock member with respect to the teeth of the ratchet body is released in a case where the speed-change locked state is released by the operation of the speed-change operation mechanism.

In the specified configuration of the first traveling operation device, the neutral biasing mechanism may include a neutral-setting pushing member capable of being rotated about a second pivot shaft substantially parallel to the first pivot shaft, the neutral-setting pushing member including a cam surface in a concave shape when seen along an axis line direction of the second pivot shaft; a neutral-setting driven member capable of being rotated about a third pivot shaft substantially parallel to the second pivot shaft, the neutral-setting driven member including a cam follower portion that engages the cam surface; and a neutral-setting biasing member for biasing the neutral-setting pushing member so that the cam surface is pushed against the cam follower portion. The neutral-setting driven member is operatively connected to the ratchet body so as to rotate about the third pivot shaft in conjunction with a rotation of the ratchet body about the pedal shaft, and the cam follower portion engages a deepest part of the cam surface when the speed operation mechanism for operating the stepless speed-change device is in a neutral state. In the configuration, the neutral biasing mechanism preferably further includes a base member that supports the neutral-setting pushing member in a rotatable manner about the second pivot shaft and supports the neutral-setting driven member in a rotatable manner about the third pivot shaft. The base member is coupled to a member configuring a vehicle frame in a positioning-adjustable manner. With the configuration, it is possible to easily adjust the neutral state of the neutral biasing mechanism.

In the specified configuration of the first traveling operation device, the speed-change operation mechanism may further include a rearward-side speed-change pedal that is relatively non-rotatable with respect to the pedal shaft, the rearward-side speed-change pedal rotating the pedal shaft about the axis line based on a manual operation. The pedal shaft rotates to one side and the other side about the axis line based on the operation of the forward-side speed-change pedal and the rearward-side speed-change pedal, respectively.

The present invention provides, in order to achieve the second object, a second traveling operation device including a forward-side speed-change pedal and a rearward-side speed-change pedal for operating a traveling stepless speed-change device provided in a working vehicle, wherein the forward-side speed-change pedal and the rearward-side speed-change pedal are arranged spaced apart in a vehicle width direction so as to define a footrest region in between at one of left and right step boards in the working vehicle.

The stepless speed-change device operated by the speed-change operation mechanism may be, for example, an HST (Hydrostatic Transmission), an HMT (Hydro Mechanical Transmission), belt type speed change device and the like.

In the second traveling operation device according to the present invention, since the forward-side and rearward-side speed-change pedals are arranged away from to each other in the vehicle width direction at one of the light and left step board so as to define the footrest region therebetween, it is possible to secure a relatively large space for placing the driver's foot at the footrest region at the one step board, thereby enhancing ride-on/off efficiency, and improving operationality even if operation members such as various operation levers are arranged at the one step board.

In the second traveling operation mechanism according to the present invention, it is possible to perform a press-down operation of the forward-side speed-change pedal and a press-down operation of the rearward-side speed-change pedal with sandwiching the footrest region in between when traveling the working vehicle in the forward direction or the rearward direction. Further, it is possible to place the foot at the footrest region with the relatively short and efficient movement of the foot from the forward-side speed-change pedal to the footrest region positioned on a side of the rearward-side speed-change pedal with the forward-side speed-change pedal as a reference when resting the foot positioned on the forward-side speed-change pedal, and it is also possible to place the foot at the footrest region with the relatively short and efficient movement of the foot from the rearward-side speed-change pedal to the footrest region positioned on a side of the forward-side speed-change pedal with the rearward-side speed-change pedal as a reference when resting the foot positioned on the rearward-side speed-change pedal in a similar manner. A footrest member for supporting the footrest region may be provided at the footrest region defined between the forward-side and rearward-side speed-change pedals.

The second traveling operation device according to the present invention may have, for example, a following specified configuration.

The second traveling operation device further includes a speed-change pedal shaft for supporting each proximal end portion of the forward-side speed-change pedal and the rearward-side speed-change pedal in a relatively non-rotatable manner. The forward-side speed-change pedal and the rearward-side speed-change pedal are respectively coupled to the speed-change pedal shaft so as to rotate the speed-change pedal shaft to one side and the other side about the axis line, respectively. The forward-side speed-change pedal is arranged on a front side and on an upper side with the speed-change pedal shaft as a reference at an outer side in the vehicle width direction at the one step board. The rearward-side speed-change pedal is arranged on a rear side and on the upper side with the speed-change pedal shaft as the reference at an inner side in the vehicle width direction at the one step board.

With the specified configuration of the second traveling operation device, it is possible to perform a press-down operation on the forward-side speed-change pedal arranged on a front side and on an upper side with the speed-change pedal shaft as a reference at an outer side in the vehicle width direction at the one step board and perform a press-down operation on the rearward-side speed-change pedal arranged on a rear side and on the upper side with the speed-change pedal shaft as the reference at an inner side in the vehicle width direction at the one step board.

In the specified configuration of the second traveling operation device, the speed-change pedal shaft coupling the forward-side speed-change pedal and the rearward-side speed-change pedal could be also used as the footrest member. That is, the speed-change pedal could be commonly used as the footrest member. With the configuration, it is not necessary to arrange an exclusive member for supporting the footrest region, thereby assembling in a simplified configuration and lowering manufacturing cost.

In a case where the speed-change pedal is commonly used as the footrest member, the forward-side speed-change pedal and the rearward-side speed-change pedal are arranged, for example, so that an intersecting area at which the line connecting the foot stepping portions of the speed-change pedals and the speed-change pedal shaft are intersected is positioned at substantially the center between the speed-change pedals of the speed-change pedal shaft. With the configuration, it is possible to place the foot at the footrest region above substantially center of the speed-change pedal shaft by moving the foot along the line from the foot stepping portion of the forward-side speed-change pedal when resting the foot positioned on the forward-side speed-change pedal, and it is possible to place the foot at the footrest region above substantially center of the speed-change pedal shaft by moving the foot along the line from the foot stepping portion of the forward-side speed-change pedal when resting the foot positioned on the forward-side speed-change pedal in a similar manner. By providing the configuration so as to allow the foot to be positioned above the substantially center of the speed-change pedal by moving the foot along the line from the respective foot stepping portion of both the speed-change pedals, the movement of the foot in a time of resting the foot could be less and more efficient while securing a large space for the footrest region.

The forward-side speed-change pedal preferably includes a first region extending toward the outer side in the vehicle width direction as going from the proximal end portion toward a distal end portion. The first region may be over the whole of the forward-side speed-change pedal or a part of the forward-side speed-change pedal. The direction of the forward-side speed-change pedal could be aligned with the direction of the foot tending to be positioned with the toe directing outward in the vehicle width direction when the driver sit on the driver's seat (in particular, in a case where the handle column is provided), thereby improving the operationality.

The forward-side speed-change pedal may further include a second region extending from the first region. The second region is deflected toward the inner side in the vehicle width direction (i.e. toward the footrest region) with the first region as the reference. The second region may project toward the front side in the vehicle longitudinal direction, or toward the inner side in the vehicle width direction. With the configuration, a distance by which the foot has to be moved when performing press-down operation on the forward-side speed-change pedal or resting the foot at the footrest region could be reduced by a length corresponding to the configuration where the second region is deflected toward the inner side in the vehicle width direction (in other words, toward the footrest region) with the first region as the reference, thereby correspondingly reducing a burden of the foot.

In the specified configuration of the second traveling operation device, it is preferable to set pedal length of each of the forward-side speed-change pedal and the rearward-side speed-change pedal within some range so as to keep the operationality of press-down operation. That is, if the pedal length is too short, it becomes difficult to perform the press-down operation. On the other hand, since the forward-side speed-change pedal and the rearward-side speed-change pedal are respectively arranged on the front side and the rear side with the speed-change pedal as the reference, the entire length in the vehicle longitudinal direction of the speed-change pedals in a state of being coupled to the speed-change pedal shaft (which means a distance by which the foot has to be moved in a time of the press-down operation on the forward-side speed-change pedal and the rearward-side speed-change pedal, and in a time of resting the foot at the footrest region) tends to be longer, resulting in involving the burden of the foot. In view of them, the speed-change pedal shaft is preferably arranged slanted with respect to a vehicle frame so that an outer end in the vehicle width direction vehicle is positioned on the rear side than an inner end in the vehicle width direction. With the configuration, it is possible to shorten the entire length in the vehicle longitudinal direction of the speed-change pedals in a state of being coupled to the speed-change pedal shaft (which means a distance by which the foot has to be moved in a time of the press-down operation on the forward-side speed-change pedal and the rearward-side speed-change pedal, and in a time of resting the foot at the footrest region) while keeping the pedal length in the vehicle longitudinal direction of each the pedals within a preferable range, thereby reducing the burden of the foot.

In a case where the specified configuration of the second traveling operation device further includes a brake pedal for operating a traveling brake device provided in the working vehicle, if the brake pedal is arranged on the one step board so as to be positioned on an outer side in the vehicle width direction as the speed-change pedal shaft, a distance by which the foot has to be moved in a time of performing press-down operation on the brake pedal becomes longer. If the brake pedal is arranged on the one step board so as to be positioned at substantially the same position along the vehicle longitudinal direction with respect to the forward-side speed-change pedal, it is needed to arrange the foot stepping part of the brake pedal at a position upper than that of the forward-side speed-change pedal due to the forward-side speed-change pedal, resulting in a necessity of putting up the foot in a time of operating the brake pedal and reducing operationality. In consideration of them, the brake pedal is preferably arranged on the one step board so as to be positioned on the inner side in the vehicle width direction with the forward-side speed-change pedal as the reference. With the configuration, it is possible to arrange the foot stepping parts of both the pedals at substantially same position in the up-and-down direction in such a manner that the foot stepping part of the brake pedal is arranged at a same position as, or in a upward or downward vicinity of that of the forward-side speed-change pedal with respect to the up-and-down direction, whereby performing press-down operation on both the forward-side speed-change pedal and the brake pedal while keeping the position of the foot with respect to the up-and-down direction, and improving operationality. In consideration of using an upper space of the brake pedal, the brake pedal is preferably suspended by a brake pedal shaft positioned above the brake pedal in a rotatable manner around the brake pedal shaft.

In any configuration, the brake pedal is preferably arranged on a front side and at substantially same position along the vehicle longitudinal direction with the rearward-side speed-change pedal as the reference. With the configuration, for example, when the driver selectively performs press-down operation on the rearward-side speed-change pedal and the brake pedal while seeing rearward, it is possible to selectively operate both the pedals only by moving the foot in the vehicle longitudinal direction between the rearward-side speed-change pedal and the brake pedal that is arranged at substantially the same position along the vehicle longitudinal direction with the rearward-side speed-change pedal, thereby simplifying the press-down operation. Substantially the same position along the vehicle longitudinal direction refers to a position at which the brake pedal is arranged so as to overlap with the rearward-side speed-change pedal with respect to the position in the vehicle width direction. In the configuration, the forward-side speed-change pedal, the rearward-side speed-change pedal, and the brake pedal are preferably arranged so that a shape formed by connecting vertexes of the foot stepping parts thereof is a triangle in plan view, or more preferably the shape is an isosceles triangle in which a distance of a line connecting between the foot stepping part of the forward-side speed-change pedal and the foot stepping part of the brake pedal and a distance of a line connecting between the foot stepping part of the rearward-side speed-change pedal and the foot stepping part of the brake pedal are substantially the same. With the configuration, it is possible to move the foot among the pedals with substantially the center of the foot as a pivot point, thereby enabling efficient operationality in which the moving distance of the foot among the pedals is short.

The specified configuration of the second traveling operation device preferably further includes a speed-change pedal shaft for supporting respective proximal end portions of the forward-side speed-change pedal and the rearward-side speed-change pedal in a relatively non-rotatable manner, and a brake pedal for operating a traveling brake device provided in the working vehicle. The forward-side speed-change pedal and the rearward-side speed-change pedal are respectively coupled to the speed-change pedal shaft so as to rotate the speed-change pedal shaft to one side and the other side about the axis line, respectively. The forward-side speed-change pedal is arranged on a front side and on an upper side with the speed-change pedal shaft as a reference at an outer side in the vehicle width direction at the one step board. The rearward-side speed-change pedal is arranged on a rear side and on the upper side with the speed-change pedal shaft as the reference at an inner side in the vehicle width direction at the one step board. The forward-side speed-change pedal includes a first region extending toward the outer side in the vehicle width direction as going from the proximal end portion toward a distal end portion, and a second region extending from the first region, the second region deflected toward the inner side in the vehicle width direction with the first region as the reference. The brake pedal is arranged on the one step board so as to be positioned on the inner side in the vehicle width direction with the forward-side speed-change pedal as the reference, and is arranged at substantially a same position along the vehicle width direction or on the front side with respect to a deflecting part between the first region and the second region of the forward-side speed-change pedal. Substantially the same position along the vehicle width direction refers to a position at which the brake pedal is arranged so as to overlap with the deflected part with respect to a position in the vehicle longitudinal direction. With the configuration, it is possible to shorten a distance by which the foot has to be moved in selectively performing press-down operation on the forward-side speed-change pedal and the brake pedal, thereby improving operationality of the press-down operation.

The present invention provides, in order to achieve the third object, a working vehicle in which the driver's seat is exposed and which includes supporting members for supporting a pair of left and right mud-shield foot-guards arranged on a front side with the driver's seat as a reference and a width indicator lamp detachable mounted to at least one of the pair of left and right foot-guard supporting members so that a light-emitting portion of the width indicator lamp faces forward.

According to the working vehicle of the present invention, since the width indicator lamp is mounted to at least one of the pair of left and right foot-guard supporting members, which are arranged on a front side with the driver's seat as a reference, so that a light-emitting portion of the width indicator lamp faces forward, when the third person sees the working vehicle from a front side or from a lateral side with a distance, the third person could visibly recognize the light from the width indicator lamp arranged on the front side in a state where the light-emitting portion face forward without the light being shielded by the driver or the vehicle main body, thereby obtaining a satisfactory visibility of the third person with respect to the working vehicle. Further, since the light from the width indicator lamp that is arranged on a front side with the driver's seat as a reference so that the light-emitting portion faces forward is irradiated forward from the front side with the driver's seat as the reference, it is of course to enhance the rearward view of the driver (for example, driver's view in a case where the driver steers the working vehicle while looking rearward), and the light irradiated forward from the width indicator lamp is less likely to enter the eyes of the driver even if the driver is facing forward, thereby enhancing the forward view of the driver (for example, driver's view in a case where the driver steers the working vehicle while looking forward). Furthermore, since the width indicator lamp is detachably provided, the working vehicle according to the present invention could easily adapt to a specification change regarding the necessity of the width indicator lamp.

The working vehicle according to the present invention may further include a direction indicator lamp detachably mounted to at least one of the pair of left and right foot-guard supporting members so that a light-emitting portion of the direction indicator lamp faces forward. The working vehicle has the same advantages as the width indication lamp with respect to the direction indicator lamp. Since the direction indicator lamp is mounted to at least one of the pair of left and right foot-guard supporting members, which are arranged on a front side with the driver's seat as a reference, so that a light-emitting portion of the direction indicator lamp faces forward, when the third person sees the working vehicle from a front side or from a lateral side with a distance, the third person could visibly recognize the light from the direction indicator lamp arranged on the front side in a state where the light-emitting portion face forward without the light being shielded by the driver or the vehicle main body, thereby obtaining a satisfactory visibility of the third person with respect to the working vehicle. Further, since the light from the direction indicator lamp that is arranged on a front side with the driver's seat as a reference so that the light-emitting portion faces forward is irradiated forward from the front side with the driver's seat as the reference, it is of course to enhance the rearward view of the driver, and the light irradiated forward from the direction indicator lamp is less likely to enter the eyes of the driver even if the driver is facing forward, thereby enhancing the forward view of the driver. Furthermore, since the direction indicator lamp is detachably provided, the working vehicle according to the present invention could easily adapt to a specification change regarding the necessity of the direction indicator lamp.

The working vehicle according to the present invention preferably includes a rearview mirror mounted to at least one of the pair of left and right foot-guard supporting members. With the configuration, an exclusive attachment member for attaching the rearview mirror does not need to be separately arranged, thereby reducing the number of components and suppressing the cost. In the configuration with the rearview mirror, he rearview mirror may be arranged to the foot-guard supporting member in a rotatable manner and/or in a detachable manner. For example, if the rearview mirror is mounted to the foot-guard supporting member in a rotatable manner, it is possible to accommodate the rearview mirror in a compact manner by turning the rearview mirror so as not to project outward (specifically, so as not to be in the way during work such as mowing), thereby improving the workability, in particular of the work in a narrow space such as the work in a barn. Further, if the rearview mirror is detachably mounted to the foot-guard supporting member, it is possible to easily reattach the rearview mirror to one and the other of the left and right foot-guard supporting members.

In a case where the working vehicle according to the present invention is configured so that both of the width indicator lamp and the direction indicator lamp are mounted to at least one of the foot-guard supporting members, it is preferable that the foot-guard supporting member includes a portion having an L-shaped cross section including an extending portion extending in a predetermined direction and a bent portion bent at substantially a right angle from the extending portion, and the width indicator lamp and the direction indicator lamp are mounted to the bent portion. The rearview mirror may be mounted to the bent portion. With the configuration, a portion out of the foot-guard supporting member at which the width indicator lamp and the direction indicator lamp are mounted could be effectively reinforced. For example, if the rearview mirror is arranged at the extending portion, it could be suppressed to transmit the vibration from the working vehicle to the rearview mirror arranged at the extending portion. Preferably, the rearview mirror is mounted to the extending portion in a rotatable manner and/or in a detachable manner.

The working vehicle according to the present invention may further includes a rear width indicator lamp and/or a rear direction indicator lamp arranged on the rear side with the driver's seat as the reference in a state where the light emitting portions thereof face rearward. With the configuration, since the light from the width indicator lamp and/or the direction indicator lamp is emitted rearward from the rear position of the driver's seat, the light from the rear width indicator lamp and/or the rear direction indicator lamp are less likely to enter the eyes of the driver even if the driver face rearward, thereby the rearward view of the driver becomes satisfactory.

According to the first traveling operation device, it is possible to release the unlocked state of the speed-change lock mechanism by operating the brake operation mechanism in a state where the speed-change lock mechanism is in the unlocked state, without providing another operation mechanism separately from the brake operation mechanism.

According to the second traveling operation device of the present invention, it is possible to secure a relatively large space for placing the driver's foot at one of the right and left step boards, thereby enhancing ride-on/off efficiency, and improving operationality even if operation members such as various operation levers are arranged at the one step board.

Further, it is possible to perform a press-down operation of the forward-side speed-change pedal and a press-down operation of the rearward-side speed-change pedal with sandwiching the footrest region in between when traveling the working vehicle in the forward direction or the rearward direction, to place the foot at the footrest region with the relatively short and efficient movement of the foot from the forward-side speed-change pedal to the footrest region positioned on a side of the rearward-side speed-change pedal with the forward-side speed-change pedal as a reference when resting the foot positioned on the forward-side speed-change pedal, and to place the foot at the footrest region with the relatively short and efficient movement of the foot from the rearward-side speed-change pedal to the footrest region positioned on a side of the forward-side speed-change pedal with the rearward-side speed-change pedal as a reference when resting the foot positioned on the rearward-side speed-change pedal in a similar manner.

Further, according to the working vehicle of the present invention, it is possible to enhance the visibility of the third person with respect to the working vehicle when the third person sees the working vehicle from a front side or from a lateral side with a distance and the rearward view of the driver.

Specifically, since the width indicator lamp is mounted to at least one of the pair of left and right foot-guard supporting members, which are arranged on a front side with the driver's seat as a reference, so that a light-emitting portion of the width indicator lamp faces forward, when the third person sees the working vehicle from a front side or from a lateral side with a distance, the third person could visibly recognize the light from the width indicator lamp arranged on the front side in a state where the light-emitting portion face forward without the light being shielded by the driver or the vehicle main body, thereby obtaining a satisfactory visibility of the third person with respect to the working vehicle. Further, since the light from the width indicator lamp that is arranged on a front side with the driver's seat as a reference so that the light-emitting portion faces forward is irradiated forward from the front side with the driver's seat as the reference, it is of course to enhance the rearward view of the driver, and the light irradiated forward from the width indicator lamp is less likely to enter the eyes of the driver even if the driver is facing forward, thereby enhancing the forward view of the driver. Furthermore, since the width indicator lamp is detachably provided, the working vehicle according to the present invention could easily adapt to a specification change regarding the necessity of the width indicator lamp.

BRIEF DESCRIPTION OF THE
DRAWINGS/FIGURES

FIG. 8(A), FIG. 8(B) and FIG. 8(C) are a side view, a plane view and a perspective view, respectively.

DETAILED DESCRIPTION OF THE PREFERRED EMBODIMENTS

Figure 1:
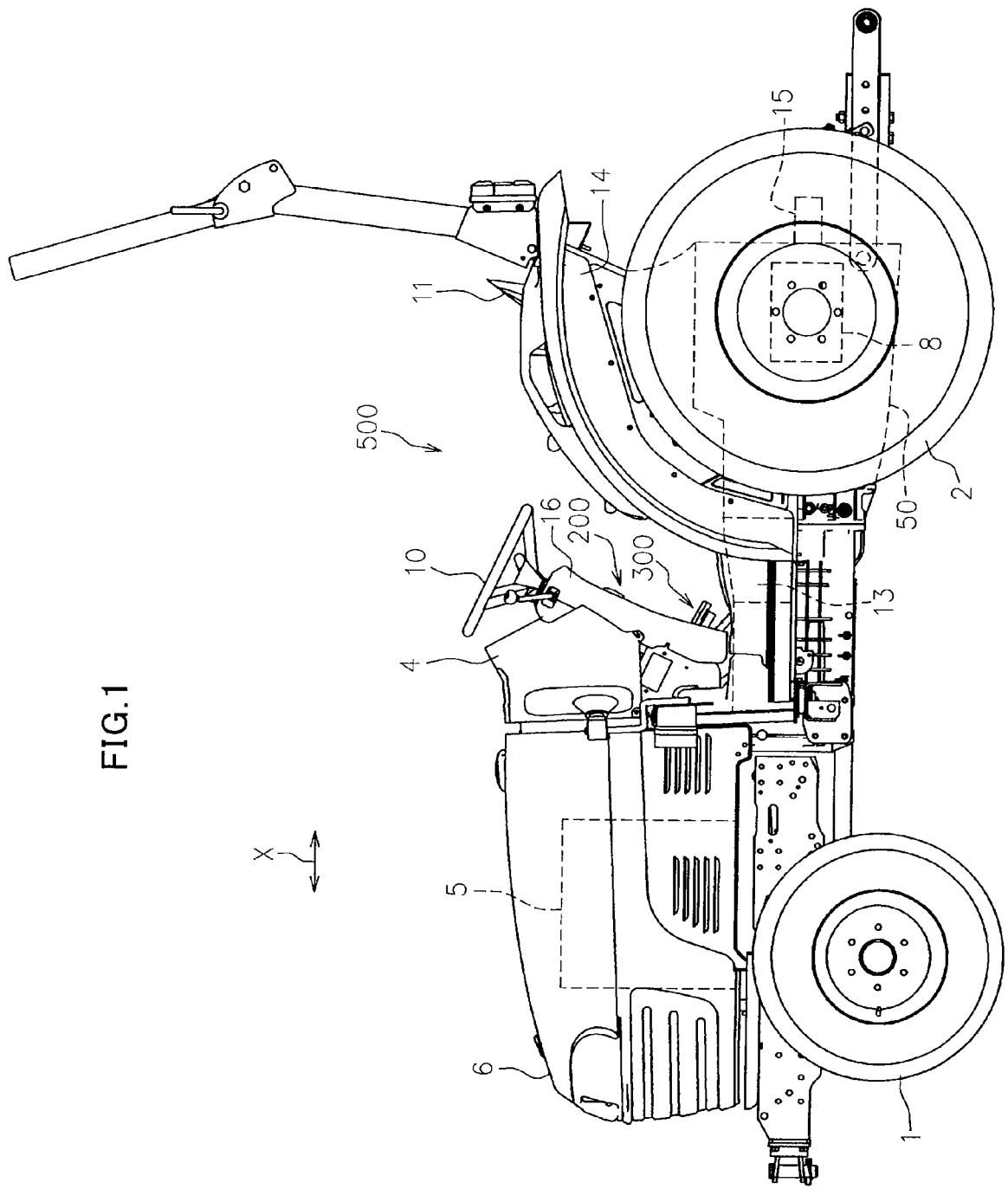
FIG. 1 is a schematic side view of a working vehicle including a traveling operation device according to a preferred one embodiment of the present invention.

Preferred embodiments of the present invention will now be described with reference to the accompanying drawings. FIG. 1 is a schematic side view of a working vehicle including a traveling operation device according to the present embodiment for achieving the first and the second objects, and FIG. 2 is a schematic front view of the vehicle.

Figure 2:
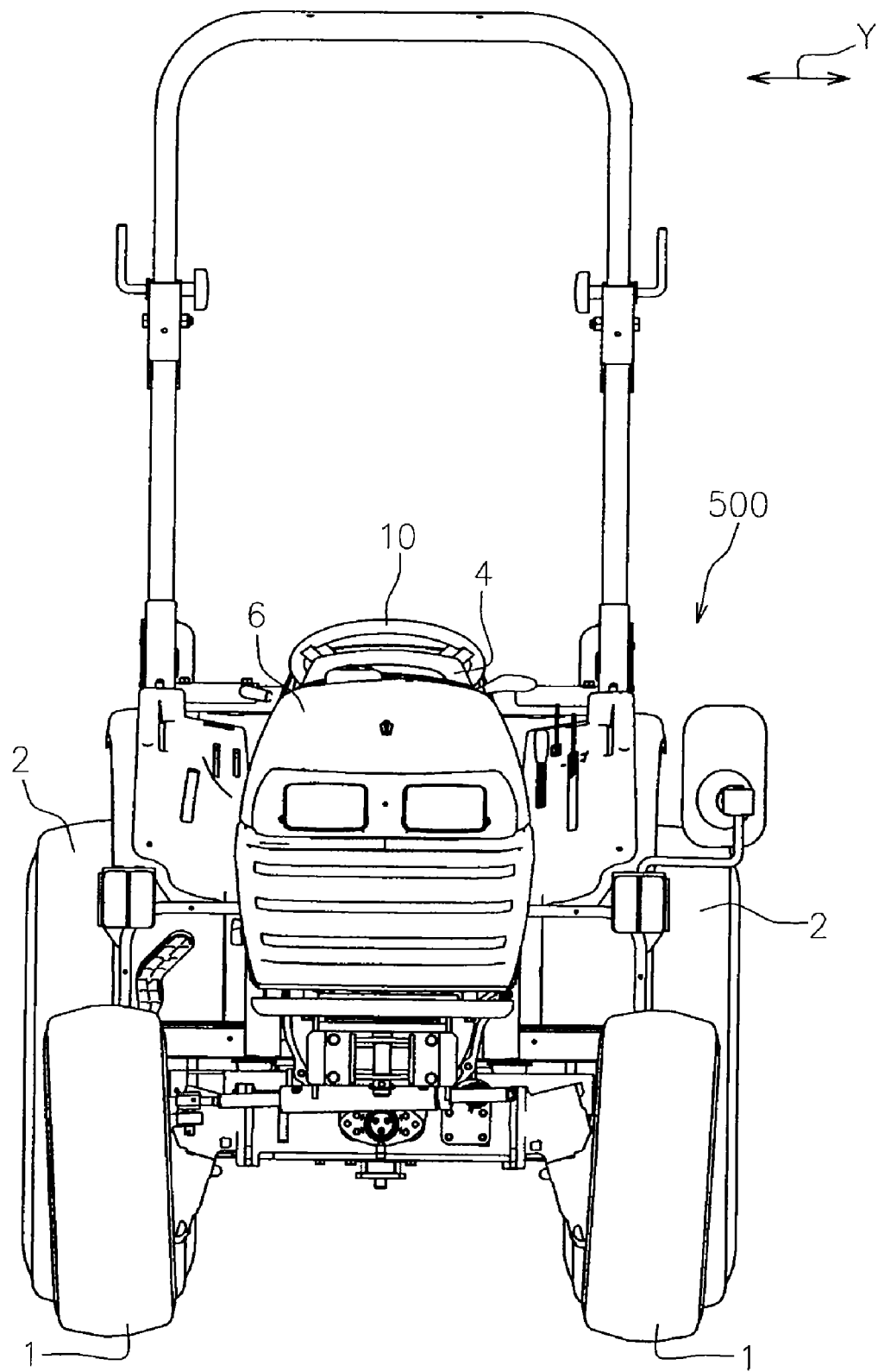
FIG. 2 is a schematic front view of the working vehicle shown in FIG. 1.

A working vehicle 500 is a tractor in the present embodiment, and is configured so that a driving force from an engine 5 serving as a driving power source is transmitted to a pair of steered wheels and a pair of non-steered wheels respectively arranged on one side and the other side in the vehicle longitudinal direction (X direction in the drawing), as shown in FIGS. 1 and 2. In the present embodiment, front wheels 1 are the steered wheels, and rear wheels 2 are the non-steered wheels.

In the working vehicle 500, the front wheels 1 and the rear wheels 2 are supported at the front side and the rear side of a vehicle body, and the engine 5 is arranged inside a bonnet 6 at the front side of the vehicle body. A dashboard 4 is arranged on the rear side of the bonnet 6, and a steering handle 10 is arranged on the dashboard 4. A handle column 16 is arranged on the lower side of the steering handle 10 and a driver's seat 11 is arranged on the rear side of the steering handle 10. Operation members such as various operation levers are arranged on the dashboard 4 in the vicinity of the steering handle 10 or on a rear wheel fender 14 on the lateral side of the driver's seat 11.

A transmission case 50 is arranged at the rear side of the engine 5, and the power from the engine 5 is transmitted to the rear wheels for driving the same. A traveling stepless speed-change device (HST 13 in the present embodiment) is integrally arranged in the transmission case 50, and the driving direction and the driving speed of the rear wheels 2 are voluntarily set by the operation of a forward-side speed-change pedal 121 and a rearward-side speed-change pedal 122 to be hereinafter described. A traveling brake device 8 including left and right rear wheel brake mechanisms for applying braking force to the rear wheels 2 serving as the driving wheels is arranged on the rear side of the HST 13. The rear wheel brake mechanisms are configured to apply the braking force directly or indirectly, and individually or integrally to a pair of main driving shafts branched and transmitted with the driving force from the engine 5 based on a selective external operation. The rear wheel brake mechanism applies the braking force individually and independently to each of the left and right rear driving shafts in the present embodiment.

Moreover, the working vehicle 500 is configured so that the driving force from the engine 5 is transmitted to a PTO shaft 15 projecting from the rear end of the transmission case 50, and the PTO shaft 15 drives a working machine, which is attached to the rear end of the vehicle body by way of a working machine attachment mechanism, through a universal joint and the like that are not shown.

The working vehicle 500 further includes a traveling operation device including a speed-change operation mechanism (HST speed-change operation mechanism in the present embodiment; not shown in FIGS. 1 and 2, see FIGS. 3 and 4 to be hereinafter described) 100 that operates the stepless speed-change device and that is biased toward the neutral side; a speed-change lock mechanism 200; and a brake operation mechanism 300.

The traveling operation device including the HST speed-change operation mechanism 100, the speed-change lock mechanism 200 and the brake operation mechanism 300 will now be described below with reference to FIGS. 3 to 11.

HST Speed-Change Operation Mechanism

Figure 3:
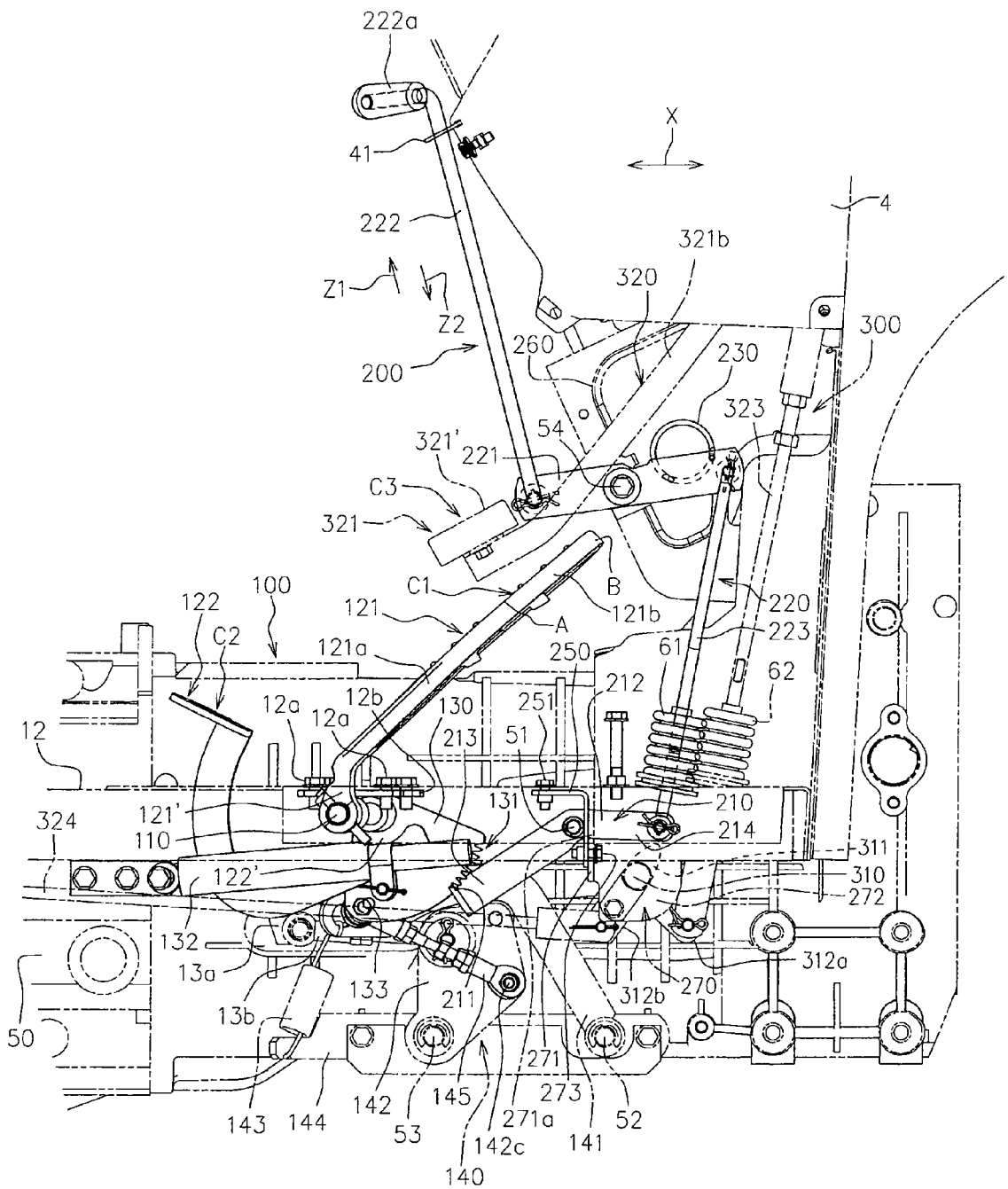
FIG. 3 is a schematic side view for explaining the traveling operation device of the one embodiment.
Figure 4:
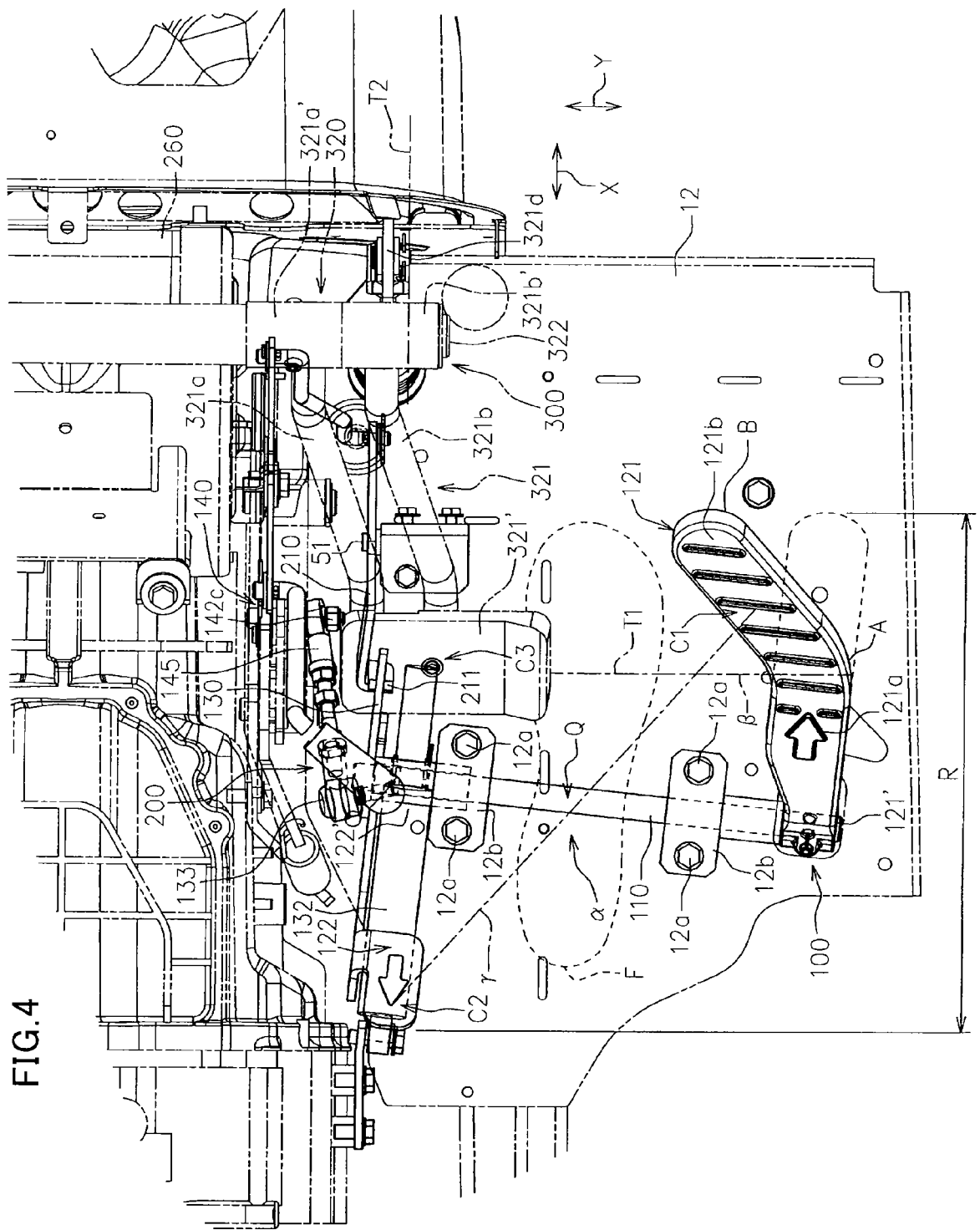
FIG. 4 is a schematic plane view for explaining the traveling operation device of the one embodiment.

FIGS. 3 and 4 are views for explaining the traveling operation device according to the present embodiment, where FIG. 3 shows a schematic side view of the traveling operation device and FIG. 4 shows a schematic plan view of the traveling operation device.

The HST operation mechanism 100 includes a speed-change pedal shaft 110, a forward-side speed-change pedal 121, a rearward-side speed-change pedal 122, a ratchet body 130, and a neutral biasing mechanism 140. Both the forward-side speed-change pedal 121 and the rearward-side speed-change pedal 122 operate the traveling stepless speed-change device (HST in the present embodiment) 13 provided in the working vehicle 500. The forward-side speed-change pedal 121 and the rearward-side speed-change pedal 122 are arranged spaced apart to each other in the vehicle width direction (Y direction in the drawings) so as to define a footrest region □ (see FIG. 4) between the pedals 121, 122 at one of the left or the right step board (the right step board 12 in the present embodiment) in the working vehicle 500.

Specifically, the pedal shaft 110 is arranged in a rotatable manner about the axis line at a supporting member 12b attached to the right step board 12 by a bolt 12a. The pedal shaft 110 supports a proximal end portion 121' of the forward-side speed-change pedal 121 in a relatively non-rotatable manner at one end (an outer end in the vehicle width direction Y in this embodiment) and a proximal end portion 122' of the rearward-side speed-change pedal 121 at the other end (an inner end in the vehicle width direction Y in this embodiment). In other words, the forward-side speed-change pedal 121 and the rearward-side speed-change pedal 122 are coupled to the speed-change pedal shaft 110 so as to respectively rotate the speed-change pedal shaft 110 to one side or the other side about the axis line based on a manual operation. The pedal shaft 110 thereby rotates to one side or the other side about the axis line based on the operation of the forward-side speed-change pedal 121 and the rearward-side speed-change pedal 122, respectively.

The forward-side speed-change pedal 121 is arranged on the front side and on the upper side with the speed-change pedal shaft 110 as the reference at an outer region in the vehicle width direction Y at the right step board 12, and the rearward-side speed-change pedal 122 is arranged on the rear side and on the upper side with the speed-change pedal 110 as the reference at an inner region in the vehicle width direction Y at the right step board 12.

In the present embodiment, the speed-change pedal shaft 110 coupling the forward-side speed-change pedal 121 and the rearward-side speed-change pedal 122 is also used as a footrest member for supporting the footrest region □ for placing the foot F. Specifically, the forward-side speed-change pedal 121 and the rearward-side speed-change pedal 122 are arranged so that an intersecting area Q at which the line □ connecting the foot stepping portions C1, C2 of the speed-change pedals 121, 122 and the speed-change pedal shaft 110 are intersected is positioned at substantially the center between the speed-change pedals 121, 122 of the speed-change pedal shaft 110.

Furthermore, the forward-side speed-change pedal 121 includes a first region 121*a* extending toward the outer side in the vehicle width direction Y as going toward the distal end from the proximal end portion 121'. The forward-side speed-change pedal 121 may be formed only by the first region 121*a* as shown with a broken line in FIG. 4, but the forward-side speed-change pedal 121 in this embodiment further includes a second region 121*b* extending from the first region 121*a*. The second region 121*b* is deflected toward the inner side in the vehicle width direction Y (i.e., to the footrest region □ side) from the distal end portion of the first region 121*a*. More specifically, the forward-side speed-change pedal 121 has a boomerang shape in plan view in which the second region 121*b* extends forward from the first region 121*a* so that the proximal end portion 121' is positioned near to the footrest region □ than the deflected part A and the distal end portion B is positioned near to the footrest region □ from the proximal end portion 121'. The second region 121*b* may be formed into a rod shape so as to project from the first region 121 a toward the inner side in the vehicle width direction Y (i.e. toward the footrest region □). In terms of shortening the entire length R in the vehicle longitudinal direction X of the speed-change pedals 121, 122 in a state of being coupled to the speed-change pedal shaft 110 (i.e., a distance by which the foot F has to be moved in a time of the press-down operation on the forward-side speed-change pedal 121 and the rearward-side speed-change pedal 122, and in a time of resting the foot F at the footrest region □), the speed-change pedal shaft 110 may be arranged to the vehicle frame (the right step board 12 in the present embodiment) in such a inclined manner that the outer end in the vehicle width direction Y is positioned on the rear side than the inner end in the vehicle width direction Y.

The ratchet body 130 includes a plurality of teeth 131 as shown in FIG. 3, and is configured to be capable of swinging about the axis line substantially parallel to the pedal shaft 110 (about the pedal shaft 110 in the present embodiment) according to the rotation about the axis line of the pedal shaft 110. The plurality of teeth 131 are arranged along a virtual circular arc having the pedal shaft 110 as the center when seen along the axis line of the pedal shaft 110.

Figure 5:
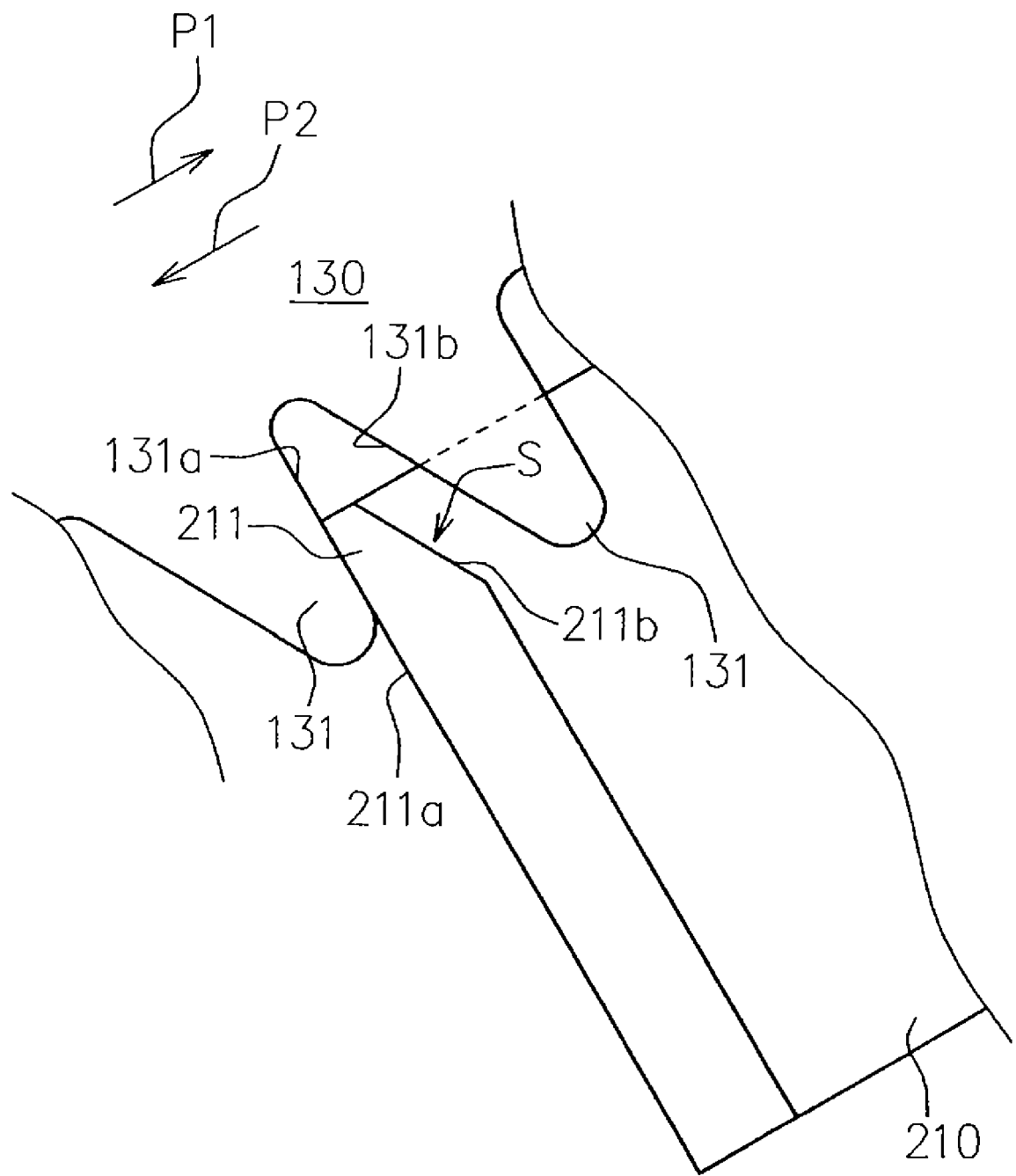
FIG. 5 is an enlarged view showing an engagement relation of plurality of teeth of a ratchet body and a lock claw in a lock member.

FIG. 5 is an enlarged view showing an engagement relation of the plurality of teeth 131 of the ratchet body 130 and a lock claw 211 in a lock member 210 to be hereinafter described. As shown in FIG. 5, the tooth 131 of the ratchet body 130 includes a tooth-side first contacting surface 131 a that contacts the lock claw 211 when the ratchet body 130 is swung toward the neutral side P1 by the biasing force of the neutral biasing mechanism 140 to be hereinafter described, and a tooth-side second contacting surface 131*b* that contacts the lock claw 211 when the ratchet body 131 is swung to the advancing side P2 against the biasing force of the neutral biasing mechanism 140 by the manual operation on the forward-side speed-change pedal 121.

The ratchet body 130 includes an air type shock absorber 132 as shown in FIGS. 3 and 4. The shock absorber 132 has a first end connected to the transmission case 50 and a second end connected to the ratchet body 130. The shock absorber 132 could prevent the forward-side speed-change pedal 121 from being press-down operated and being returned to the neutral side rapidly.

Figure 6:
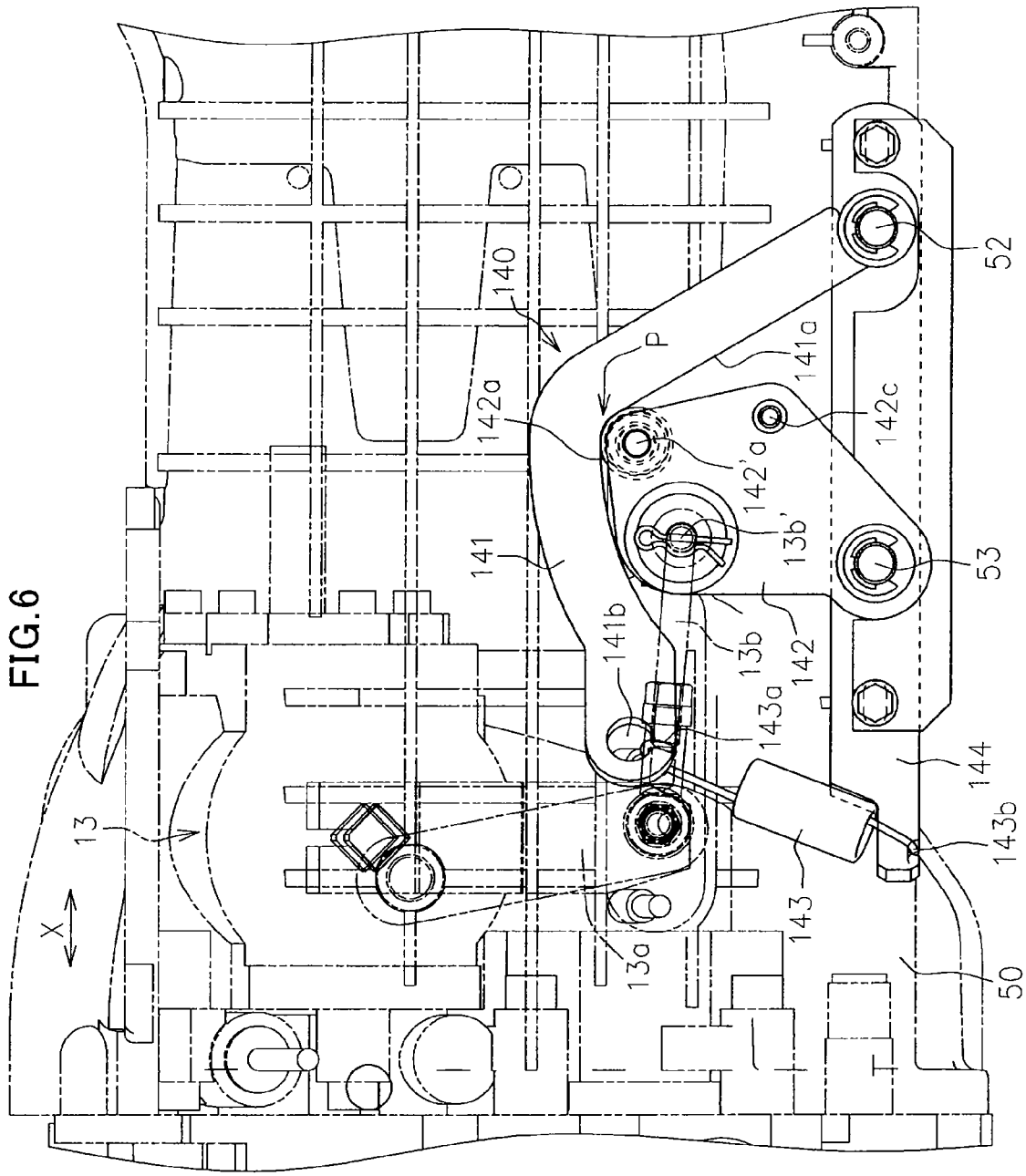
FIG. 6 is an enlarged view showing a neutral biasing mechanism shown in FIGS. 3 and 4, and the peripheral portion thereof.

FIG. 6 is an enlarged view showing the neutral biasing mechanism 140 and the peripheral portion thereof shown in FIGS. 3 and 4. The neutral biasing mechanism 140 is configured so as to operatively bias or urge the pedal shaft 110 (not shown in FIG. 6) toward the neutral side, and includes a neutral-setting pushing member 141, a neutral-setting driven member 142 and a neutral-setting biasing member 143, as shown in FIG. 6.

The neutral-setting pushing member 141 is supported to a base member 144 attached to the transmission case 50 in a rotatable manner about a second pivot shaft 52 substantially parallel to a first pivot shaft 51 (see FIGS. 3 and 4) to be hereinafter described. The neutral-setting pushing member 141 includes a cam surface 141*a* having a concave shape when seen along the direction of the axis line of the second pivot shaft 52. The neutral-setting driven member 142 is supported at the base member 144 attached to the transmission case 50 in a rotatable manner about a third pivot shaft 53 substantially parallel to the second pivot shaft 52. The neutral-setting driven member 142 includes a cam follower portion (a bearing 142*a* in the present embodiment) that engages the cam surface 141 a of the pushing member 141. The bearing 142*a* is supported by a supporting shaft 142*a'* fixed to the neutral-setting driven member 142. The neutral-setting biasing member 143 biases the neutral-setting pushing member 141 so that the cam surface 141 a of the pushing member 141 is pressed against the bearing 142*a*. In the present embodiment, the biasing member 143 is a helical spring having a first end 143*a* engaged into a through hole 141*b* that is formed at the free end of the pushing member 141 and a second end connected to the base member 144 that is attached to the transmission case 50. The neutral-setting driven member 142 is operatively connected to the ratchet body 130 so as to rotate about the third pivot shaft 53 in conjunction with the rotation of the ratchet body 130 about the pedal shaft 110. The movement of the ratchet body 130 and the driven member 142 will be further described with reference to FIG. 7.

Figure 7:
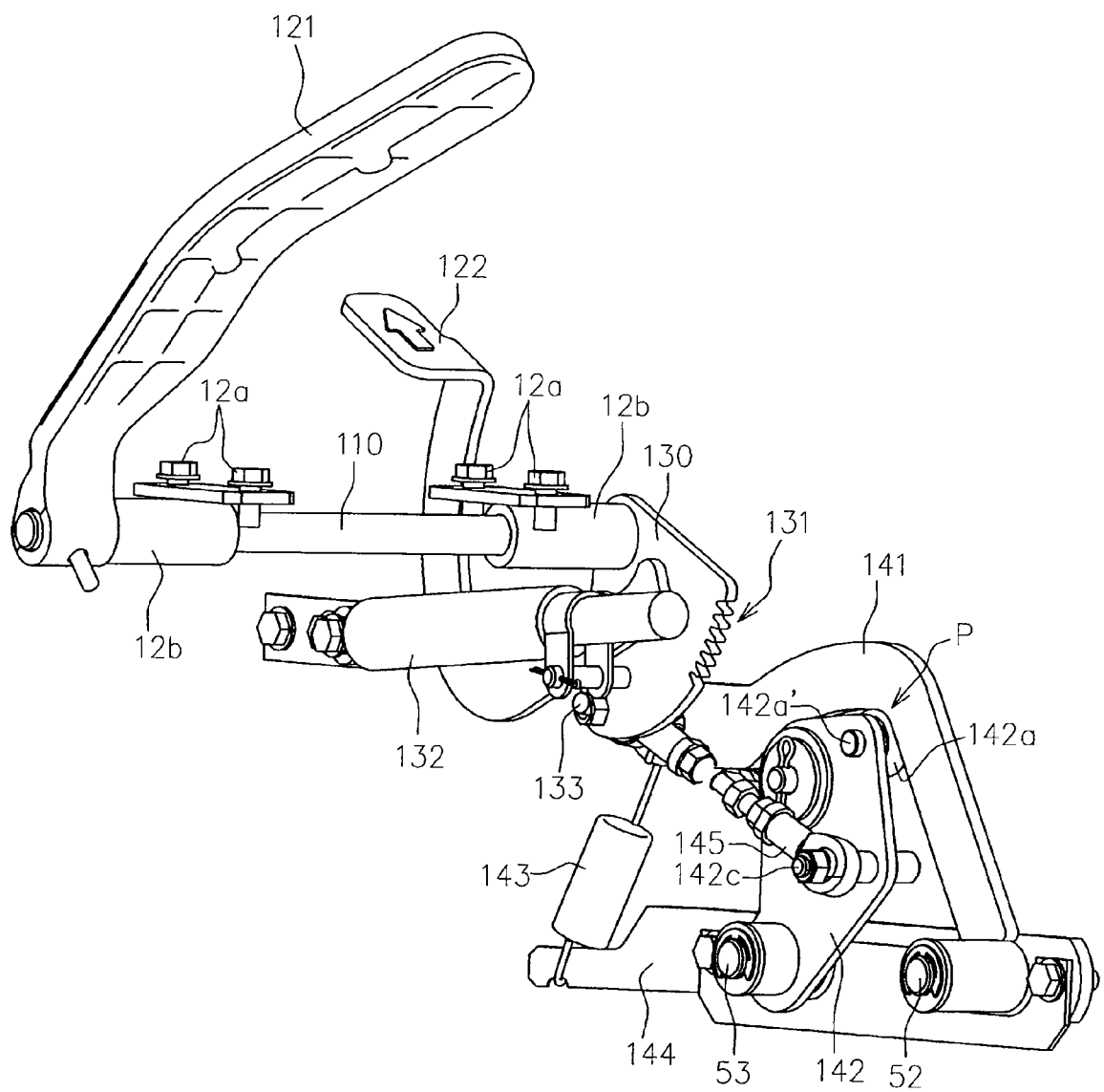
FIG. 7 is a view for explaining the operative connection relationship of a neutral-setting driven member and a ratchet body.

FIG. 7 is a view for explaining the operative connection relationship of the neutral-setting driven member 142 and the ratchet body 130. As shown in FIG. 7, the driven member 142 includes a supporting shaft 142*c* fixed thereto so as to be substantially parallel to the third pivot shaft 53, and the ratchet body 130 includes a supporting shaft 133 fixed thereto so as to be substantially parallel to the third pivot shaft 53. A coupling member 145 is connected to the supporting shaft 142c of the driven member 142 at its first end in a rotatable manner and is connected to the supporting shaft 133 of the ratchet body 130 at its second end in a rotatable manner. The driven member 142 thus rotates about the third pivot shaft 53 in conjunction the rotation of the ratchet body 130 about the pedal shaft 110 through the coupling member 145.

As shown in FIG. 6, the HST 13 includes a speed-change arm 13a for setting the driving direction and the driving speed of the HST 13, which speed-change arm 13a swings along the vehicle longitudinal direction X. The speed-change arm 13a is operatively connected to the driven member 142 so as to swing in the vehicle longitudinal direction X in conjunction with the rotation of the driven member 142 about the third pivot shaft 53. Specifically, the speed-change arm 13a includes a coupling member 13b that is rotatable about the axis line substantially parallel to the supporting shaft 142c. The driven member 142 is formed with a through hole 142b (see FIG. 8) that passed the driven member 142 in a direction substantially parallel to the supporting shaft 142c. The coupling member 13b has a free end 13b' that is bent toward the through hole 132b of the driven member 142 so as to be engaged into the through hole 142b in a rotatable manner about the axis line of the through hole 132b. The speed-change arm 13a thus can swing in the vehicle longitudinal direction X in conjunction with the rotation of the driven member 142 about the third pivot shaft 53 through the coupling member 13b, so that the driving direction and the driving speed of the HST 13 are voluntarily set.

The bearing 142a is configured so as to engage the deepest part P of the cam surface 141a of the pushing member 141 when the HST speed-change operation mechanism 100 is in the neutral state. The HST speed-change operation mechanism 100 is thus constantly in a state biased toward the neutral side.

Figure 8:
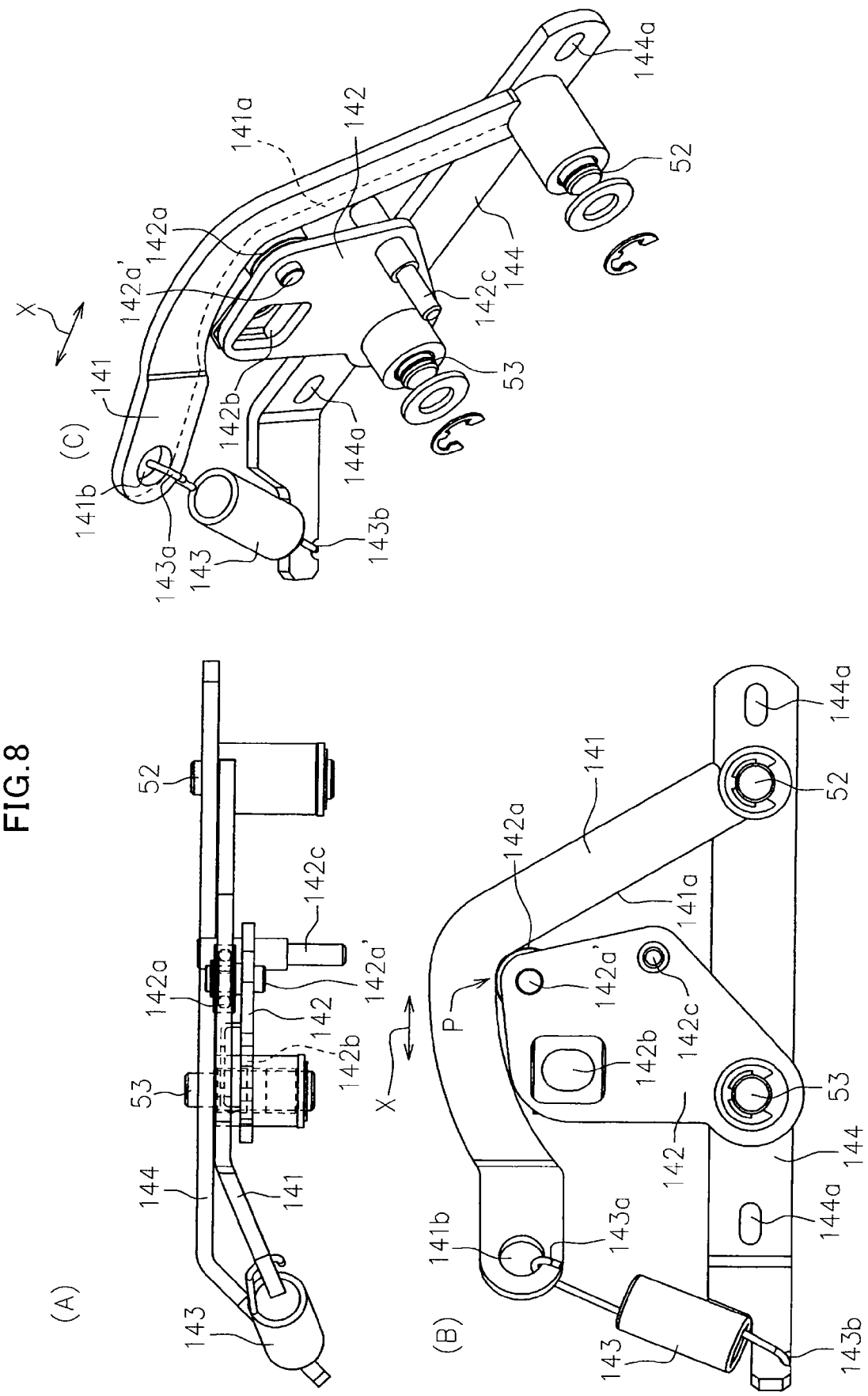
FIG. 8 is a schematic view of the neutral biasing mechanism.

The neutral biasing mechanism 140 includes the base member 144 attached to the transmission case 50, the base member 144 supporting the pushing member 141 so as to be rotatable about the second pivot shaft 52 and supporting the driven member 142 so as to be rotatable about the third pivot shaft 53, as described above. The base member 144 is attached to the transmission case 50 in a positioning-adjustable manner. Specifically, the base member 144 includes an elongated adjustment hole 144a, which longitudinal direction lies in the vehicle longitudinal direction X, and is positioning-adjustable along the vehicle longitudinal direction X with respect to the transmission case 50 by loosening the bolt that is attached to the transmission case 50 with passing through the adjustment hole 144a, as shown in FIG. 8.

Speed-Change Lock Mechanism

The speed-change lock mechanism 200 is manually operated so as to selectively take a speed-change locked state in which the HST speed-change operation mechanism 100 is held at a voluntary speed-change position and an unlocked state in which the speed-change locked state is released. The speed-change lock mechanism 200 includes a lock operation member 220 and an unlock biasing member 230 in addition to the lock member 210 with the lock claw 211 described above, as shown in FIG. 3.

The lock member 210 is rotatable about the first pivot shaft 51 substantially parallel to the pedal shaft 110 so as to selectively take a locked position where the lock claw 211 engages the teeth 131 and a released position where the lock claw 211 is moved away from the teeth 131. The lock member 210 is configured so that the lock claw 211 selectively engages one of the plurality of teeth 131 of the ratchet body 130.

More specifically, the lock member 210 includes a center portion 212 supported by the first pivot shaft 110 in a rotatable manner about the axis line, a first arm portion 213 extending from the center portion 212 toward the ratchet body 130, and a second arm portion 214 extending toward the side opposite the first arm portion 213 with the center portion 212 in between, where the first arm portion 213 lies along a tangential direction with respect to the virtual circular arc. The first arm portion 213 has a free end that is bent at substantially right angle so as to be along the vehicle width direction Y. The lock claw 211 is formed at the bent free end of the first arm portion 213. The lock claw 211 includes a claw-side first contacting surface 211a and a claw-side second contacting surface 211b respectively corresponding to the tooth-side first and second contacting surfaces 131a, 131b of the tooth 131 of the ratchet body 130, as shown in FIG. 5. In the present embodiment, the tooth-side first contacting surface 211a lies in the radial direction with the pedal shaft 110 as the reference, and the tooth-side second contacting surface 211b is arranged so as to be away from the tooth-side first contacting surface 211 a as extending radially outward with the pedal shaft 110 as the reference. The teeth 131 and the lock claw 211 are configured so as to form a space S between the respective second contacting surfaces 131b, 211b when the respective first contacting surfaces 131a, 211a contact. The first pivot shaft 51 is supported by a supporting member 250 attached to the right step board with a bolt 251.

The lock operation member 220 is capable of being manually operated so as to position the lock member 210 at the locked position or the unlocked position. The lock operation member 220 includes a first operation member 221, a second operation member 222 and a third operation member 223. The first operation member 221 is has a center portion supported in a rotatable manner by a supporting shaft 54, which is fixed to a brake bracket 260 so as to be substantially parallel to the first pivot shaft 51, a first end portion connected to a first end of the second operation member 222 in a rotatable manner about the axis line substantially parallel to the supporting shaft 54, and a second end portion connected to a first end of the third operation member 223. The second operation member 222 having the first end connected to the first operation member 221 includes a second end forming a gripping portion 222a. The second operation member 222 is supported at the second end side in a slidable manner along substantially the up and down direction by a supporting member 41 arranged at the dashboard 4. The third operation member 223 having the first end connected to the first operation member 221 includes a second end connected to the second arm 214 of the lock member 210 in a rotatable manner about the axis line substantially parallel to the supporting shaft 54. With the configuration, when the gripping portion 222a of the second operation member 222 is pulled upward, the first operation member 221 is rotated in the clockwise direction in the drawing with the supporting shaft 54 as a pivot point so that the third operation member 223 is moved downward. The lock member 210 is then turned in the clockwise direction in the drawing with the first pivot shaft 51 as a pivot point so as to be positioned at the locked position. When the gripping portion 222a of the second operation member 222 is pushed downward, on the other hand, the first operation member 221 is rotated in the counterclockwise direction in the drawing with the supporting shaft 54 as a pivot point so that the third operation member 223 is moved upward. The lock member 210 is then turned in the counterclockwise direction in the drawing with the first pivot shaft 51 as the pivot point so as to be positioned at the unlocked position. The reference character 61 is a grommet rubber for preventing noise and entering of dust etc.

The unlock biasing member 230 is configured so as to operatively bias or urge the lock member 210 toward the unlocked position. The biasing member 230 is a coil spring that applies the biasing force by using a returning force caused in a returning motion from its torsional state to its neutral state. Specifically, the biasing member 230 has a first end connected to a side, which is connected to the third operation member 223, of the first operation member 221, and a second end connected to the handle bracket 260 so that the first operation member 221 is constantly biased in the counterclockwise direction in the drawing with the supporting shaft 54 as the pivot point. The lock member 210 is thereby biased toward the unlocked position.

Brake Operation Mechanism

Figure 9:
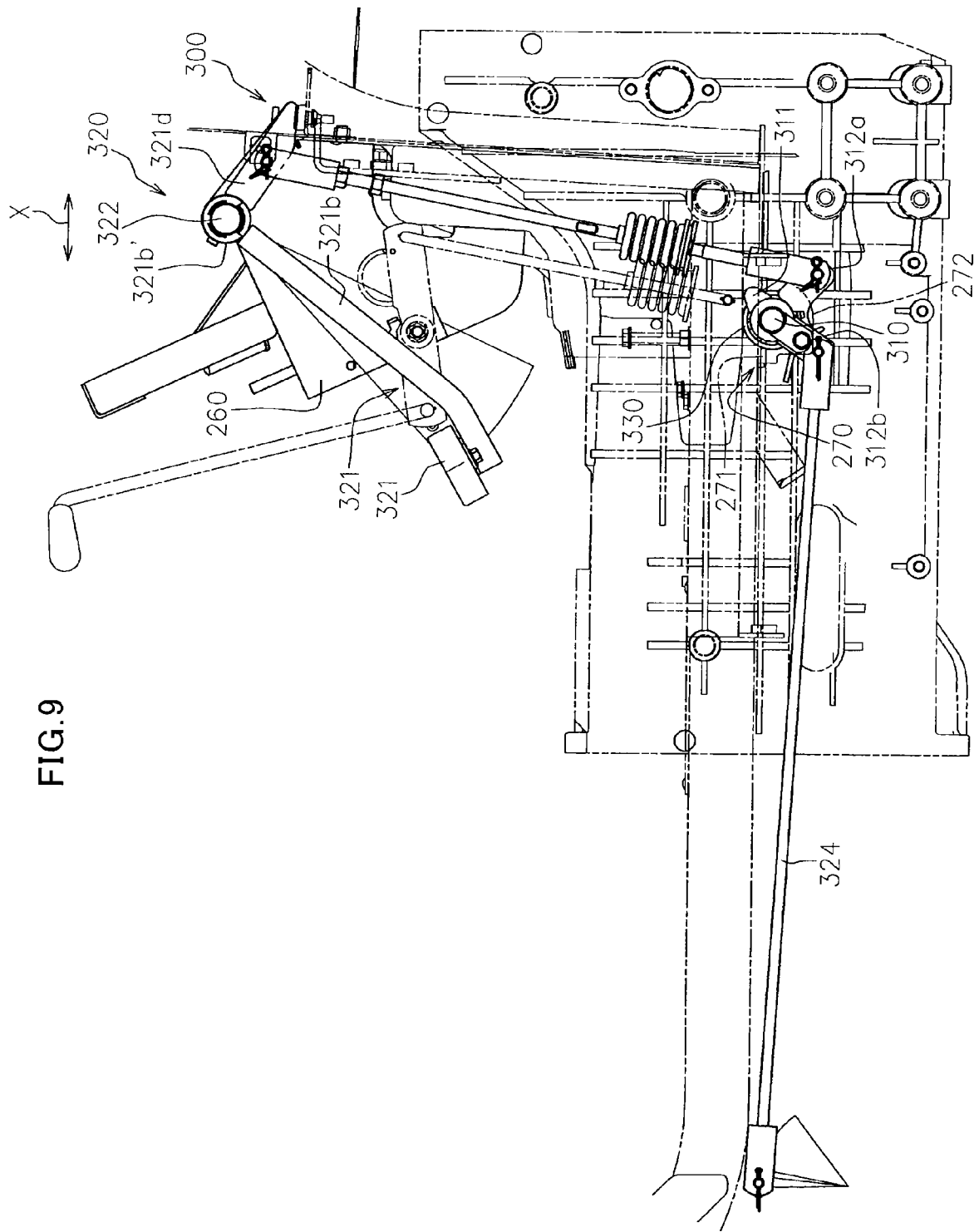
FIG. 9 is a schematic side view for explaining a brake operation mechanism.
Figure 10:
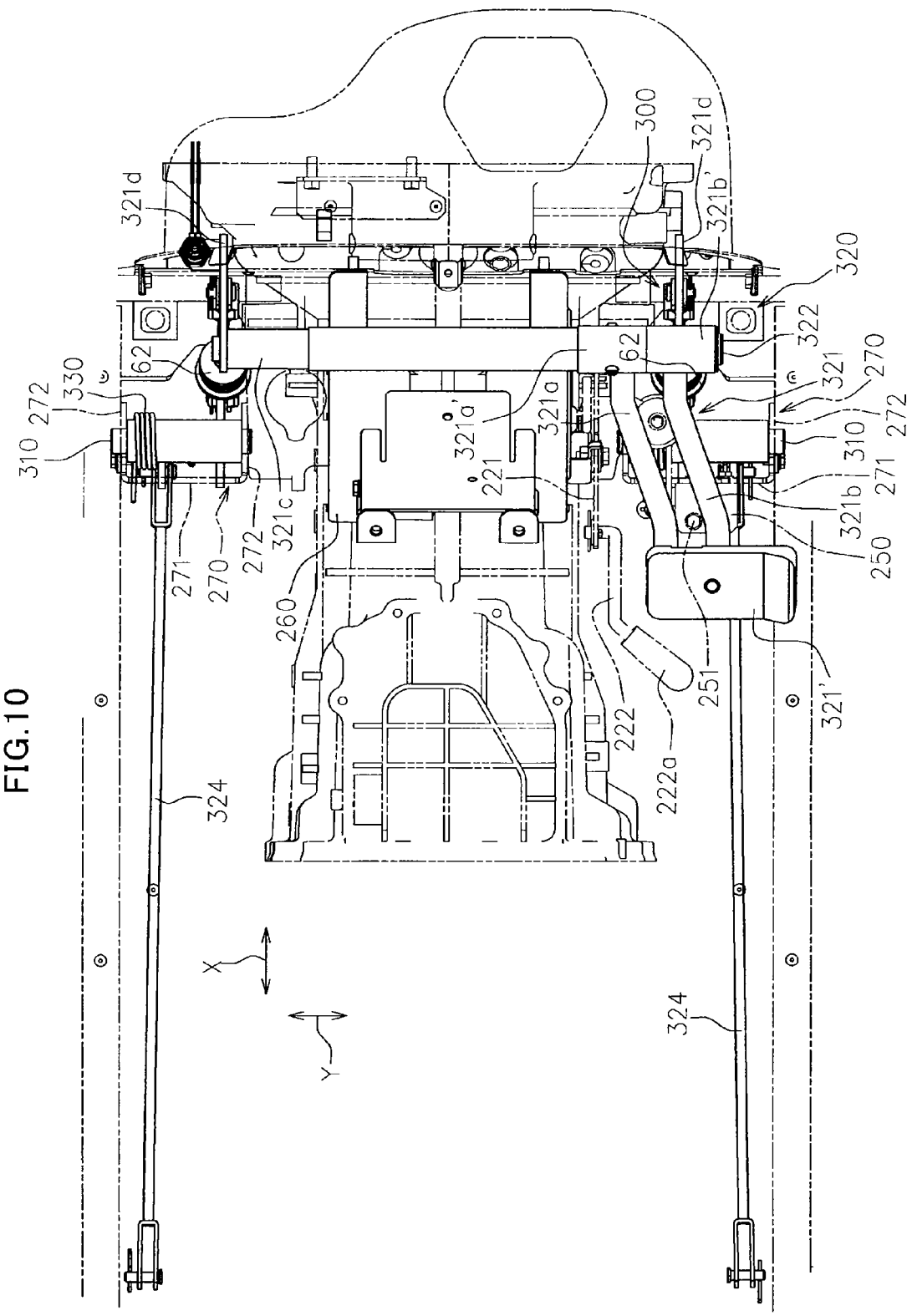
FIG. 10 is a schematic plane view for explaining the brake operation mechanism.
Figure 11:
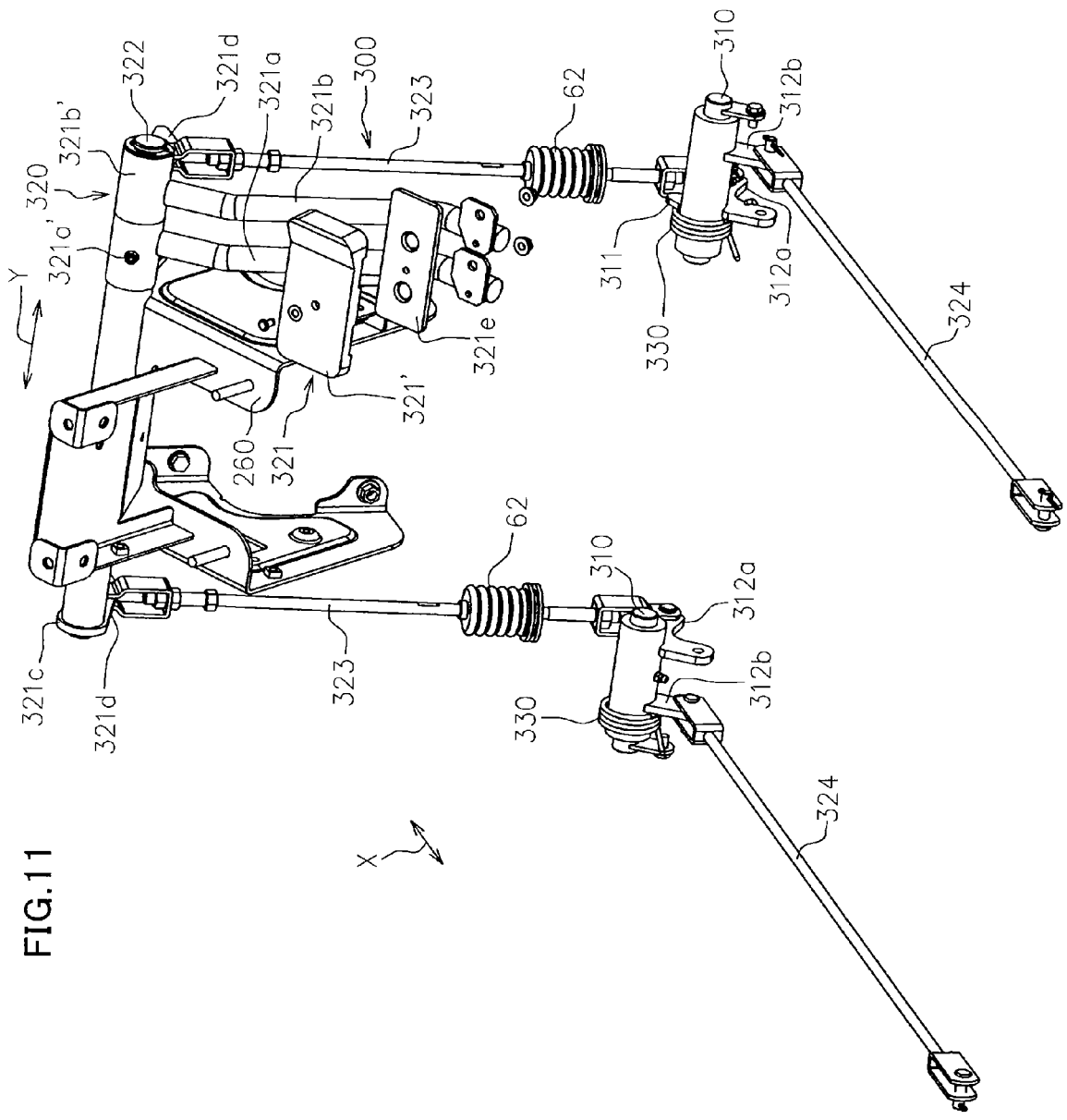
FIG. 11 is a schematic perspective view for explaining the brake operation mechanism.

FIGS. 9 to 11 are views for explaining the brake operation mechanism 300, where FIG. 9 is a schematic side view, FIG. 10 is a schematic plan view, and FIG. 11 is a schematic perspective view. The brake operation mechanism 300 is arranged to operate the traveling brake device 8, and is configured to shift the speed-change lock mechanism 200 from the speed-change locked state to the unlocked state in a time of operating the brake device 8. The brake operation mechanism 300 includes left and right brake operation shafts 310, a brake operation member 320, and left and right brake-releasing biasing members 330.

The left and right brake operation shafts 310 are arranged substantially parallel to the first pivot shaft 51, and are rotatable about the axis line so as to take a brake-actuated position of actuating the traveling brake device 8 and a brake-released position of releasing the brake actuation of the traveling brake device 8. The brake operation shafts 310 are supported by left and right supporting members 270 (not shown in FIG. 11, see FIG. 3). The left and right supporting members 270 have a "horseshoe" shape in cross section in which the center portion in the longitudinal direction of a plate-like member forms a base portion 271 and both end portions are bent from the opposite ends of the center portion at substantially right angle to form side portions 272. The supporting members 270 are configured to support both ends of the left and right brake operation shafts 310 in a rotatable manner about the axis line at the bent side portions 272. The right brake operation shaft 310 will now be described in more detail. The right supporting member 270 supporting the right brake operation shaft 310 has the base portion 271 fixed to the supporting member 250 for supporting the first pivot shaft 51 with a bolt 273. The right supporting member 270 is formed with a through hole 271a at the base portion 271. The through hole 271a is configured so that the second arm portion 214 of the lock member 210 supported in a rotatable manner by the first pivot shaft 51 and connected in a rotatable manner to the third operation member 223 passes therethrough. That is, the second arm 214 passes through the through hole 271a to be enclosed by the supporting member 270.

The right brake operation shaft 310 is provided with an engaging portion 311 that contacts the second arm portion 214 of the lock member 210 to move the lock member 210 from the locked position to the unlocked position when the right brake operation shaft 310 is moved from the brake-released position to the brake-actuated position. The engaging portion 311 is formed into a convex shape so as to engage the second arm 214 of the lock member 210.

The right and left brake operation members 320 are capable of being manually operated so as to selectively position the left and right brake operation shafts 310 each at the brake-actuated position or the brake-released position, and are configured to simultaneously actuate the left and right rear wheel brake mechanisms in the traveling brake device 8. The brake operation member 320 includes a brake pedal 321, a brake pedal shaft 322, left and right first brake rods 323, and left and right second brake rods 324.

The brake pedal 321 includes left and right brake proximal end portions 321a', 321b' supported in a rotatable manner about the brake pedal shaft 322, left and right brake arms 321a, 321b extending rearward and downward from the brake proximal end portions 321a' and 321b', and pedal press-down portions 321' arranged at the free ends of the brake arms 321a, 321b, as shown in FIG. 11.

The brake pedal shaft 322 is arranged along the vehicle width direction Y, and is supported by the brake bracket 260 in a rotatable manner about the axis line. A left brake coupling member 321c is supported in a relatively non-rotatable manner at the left end in the vehicle width direction Y of the brake pedal shaft 322. The left brake proximal end portion 321a' is supported in a relatively non-rotatable manner on the brake pedal shaft 322, and the right brake proximal end portion 321b' is supported in a relatively rotatable manner on the brake pedal shaft 322 at a position adjacent to the right side of the left proximal end portion 321b' in the vehicle width direction Y. The left brake coupling member 321c and the right brake proximal end portion 321b' each has a brake lever 321d.

Both the left and right brake operation shafts 310 include two lever portions 312a, 312b radially projecting with the center of rotation axis as the reference. The right first brake rod 323 has a first end connected in a rotatable manner to a right brake lever 321d arranged at the right brake proximal end portion 321b' and a second end connected in a rotatable manner to a first lever portion 312a of the right brake operation shaft 310. The right second brake rod 324 has a first end connected in a rotatable manner to a second lever portion 312b of the right brake operation shaft 310 and a second end connected in a rotatable manner to a right brake mechanism actuating member (not shown) arranged on the right side in the vehicle width direction Y of the brake device 8. The right brake mechanism actuating member actuates the back right wheel brake mechanism of the brake device 8 when moved in the brake-actuating direction, and releases the actuation of the right rear wheel brake mechanism when moved in the brake-releasing direction.

The left first and second brake rods 323, 324 have a configuration similar to the right first and second brake rods 323, 324. That is, the left first brake rod 323 has a first end connected in a rotatable manner to a left brake lever 321d arranged in the left brake coupling member 321c and a second end connected in a rotatable manner to the first lever portion 312a of the left brake operation shaft 310. The left second brake rod 324 has a first end connected in a rotatable manner to the second lever portion 312b of the left brake operation shaft 310, and a second end connected in a rotatable manner to a left brake mechanism actuating member (not shown) arranged on the left side in the vehicle width direction Y of the brake device 8. The left brake mechanism actuating member actuates the left rear wheel brake mechanism of the brake device 8 when moved in the brake-actuating direction, and releases the actuation of the left back brake mechanism when moved in the brake-releasing direction. The reference character 62 is a grommet rubber for preventing noise and entering of dust and the like.

According to such configuration, the left and right rear wheel brake mechanisms in the brake device 8 can be actuated separately or independently. In the present embodiment, the brake pedal 321 is further provided with the pedal press-down portion 321' for simultaneously actuating the left and right rear wheel brake mechanisms. The pedal press-down portion 321' is attached by way of a coupling plate 321e to the left and right brake arms 321a, 321b at the free ends of the brake arms 321a, 321b so as to integrally couple the brake arms 321a, 321b. The pedal press-down portion 321' extends outward to the left and the right from the brake arms 321a, 321b.

The thus configured brake pedal 321 is arranged on the right step board 12 so that the pedal press-down portion 321' is positioned on the inner side in the vehicle width direction Y with the forward-side speed-change pedal 121 as the reference and at substantially the same position along the vehicle width direction Y with respect to the deflected part A between the first region 121a and the second region 121b of the forward-side speed-change pedal 121 with the position in the vehicle longitudinal direction of the deflected part A as the reference T1, and is also arranged on the front side from the rearward-side speed-change pedal 122 at substantially the same position along the vehicle longitudinal direction X with respect to the rearward-side speed-change pedal 122. Substantially the same position along the vehicle width direction Y refers to a position at which the pedal press-down portion is arranged so as to overlap with the position T1 in the vehicle longitudinal direction X of the deflected part A. Substantially the same position along the vehicle longitudinal direction X refers to a position at which the pedal press-down portion is arranged so as to overlap with the position T2 in the vehicle width direction Y of the rearward-side speed-change pedal 122. The forward-side speed-change pedal 121, the rearward-side speed-change pedal 122, and the brake pedal 321 are arranged so that a shape formed by connecting vertexes of the foot stepping parts C1 to C3 thereof is a triangle in plan view, or substantially an isosceles triangle in the present embodiment in which a distance of a line connecting between the foot stepping part C1 of the forward-side speed-change pedal 121 and the foot stepping part C3 of the brake pedal 321 and a distance of a line connecting between the foot stepping part C2 of the rearward-side speed-change pedal 122 and the foot stepping part C3 of the brake pedal 321 are substantially the same. The brake pedal 321 is a suspending type in which the brake pedal 321 is supported in a rotatable manner about the brake pedal shaft 322 positioned above the brake pedal 321, as shown in FIGS. 9 and 11, and the position of the foot stepping part C3 of the brake pedal 321 is arranged at substantially the same position in the up and down direction (in the vicinity of the upper side in the present embodiment) with respect to the position of the foot stepping part C1 of the forward-side speed-change pedal 121.

The left and right brake-releasing biasing members 330 are respectively configured to operatively bias the left and right brake operation shafts 310 toward the brake-released position. The brake-releasing biasing member 330 is a coil spring that applies the biasing force by using a returning force caused in a returning motion from its torsional state to its neutral state. The brake-releasing biasing member 330 has a first end connected to the second lever portion 312b of the corresponding brake operation shaft 310 and a second end connected to the corresponding supporting member 270 so that left and right brake operation shafts 310 are constantly biased about the axis line in the clockwise direction in FIGS. 9 and 11. With the configuration, the brake operation shaft 310 is biased toward the brake-released position.

The brake operation mechanism 300 is configured so as to be positioned at the brake-actuated position when the driver performs the press-down operation on the brake pedal 321 against the biasing force, whereby both the left and right brake mechanisms are in the brake ON state. When the press-down operation by the driver is released, the brake pedal 321 automatically returns to the brake-released position, whereby both the left and right brake mechanisms are in the brake OFF state. More specifically, when the brake pedal 321 is press-down operated through the pedal press-down portion 321', the left and right brake proximal end portions 321a', 321b' turn in the counterclockwise direction in the drawing. The left and right brake levers 321d then pivot upward therewith, whereby the left and right first brake rods 323 move upward. Then, the left and right brake operation shafts 310 turn in the counterclockwise direction in the drawing and the left and right second brake rods 324 move forward, so that the left and right brake mechanism actuating members move in the brake-actuating direction in conjunction therewith, thereby actuating the left and right rear wheel brake mechanisms of the brake device 8. On the other hand, when the press-down operation of the brake pedal 321 is released, the left and right brake proximal end portions 321a', 321b' turn in the clockwise direction in the drawing, and the left and right brake levers 321a pivot downward therewith, whereby the left and right first brake rods 323 move downward. The left and right brake operation shafts 310 then turn in the clockwise direction in the drawing and the left and right second brake rods 324 move rearward, so that the left and right brake mechanism actuating members move in the brake-releasing direction in conjunction therewith, thereby releasing the left and right rear wheel brake mechanisms of the brake device 8.

In the traveling operation device described above, the speed-change pedal shaft 110 of the HST speed-change operation mechanism 100 is constantly biased toward the neutral side by the neutral biasing mechanism 140. When a manual operation toward the forward direction is performed on the forward-side speed-change pedal 121 with the pedal shaft 110 biased toward the neutral side, the pedal shaft 110 rotates about the axis line toward the forward side (clockwise direction in FIG. 3), and the ratchet body 130 swings to the forward side about the pedal shaft 110 according to the rotation about the axis line of the pedal shaft 110 therewith. In this case, the pedal shaft 110 is constantly biased toward the neutral side from the forward side, and therefore, attempts to return to the neutral side when the manual operation toward the forward side on the forward-side speed-change pedal 121 is released, but is held at the speed-change locked state at a voluntary speed-change position by the speed-change lock mechanism 200, depending on needs.

That is, the lock member 210 is constantly held at the released position by the coil spring 230 in the speed-change lock mechanism 200. When the lock member 210 swings about the first pivot shaft 51 (counterclockwise direction in FIG. 3) to be positioned at the locked position from the released position based on the manual operation toward the locked position on the lock operation member 220, the lock claw 211 engages the teeth 131 of the ratchet body 130 while the lock member 210 is being biased toward the released position by the coil spring 230. The HST speed-change operation mechanism 100 is thereby in the speed-change locked state of being held at the voluntary speed-change position.

More specifically, the ratchet body 130 is biased toward the neutral side by the biasing force of the neutral biasing mechanism 140. However, when the speed-change lock mechanism 200 is in the speed-change locked state, the lock claw 211 at the first arm portion 213 along the tangential direction with respect to the virtual circular arc engages the teeth 131 of the ratchet body 130 that swing along the virtual circular arc. At this time, the tooth-side first contacting surface 131a of the ratchet body 130 contacts the claw-side first contacting surface 211a of the lock claw 211 (see FIG. 5). The lock claw 211 of the lock member 210 biased toward the released position by the coil spring 230 attempts to swing in the direction of moving away from the ratchet body 130 about the first pivot shaft 51, but since the plurality of teeth 131 of the ratchet body 130 biased toward the neutral side are arranged along the virtual circular arc, the lock claw 211 at the first arm 213 lies in the tangential direction with respect to the virtual circular arc, and the tooth-side first contacting surface 131a is formed in the radial direction with the pedal shaft 110 as the reference, force along the tangential direction (in other words, the direction toward the first pivot shaft 51) is acted from the tooth-side first contacting surface 131a to the claw-side first contacting surface 211a in a case where the tooth-side first contacting surface 131a is contacting the claw-side first contacting surface 211a, whereby the lock member 210 is held at the locked position.

The speed-change locked state is released by:
1. pressing down the brake pedal 321;
2. operating the lock operation member 220; or
3. pressing down the forward-side speed-change pedal 121 up to the position where the first contacting surface 211a and the teeth 131 are separated from each other.

Unlocking by Brake Pedal

In the brake operation mechanism 300, the brake operation shaft 310 is constantly biased toward the brake-released position by the coil spring 330. When the brake operation member 320 is manually operated to the brake-actuated position while the brake operation shaft 310 is biased toward the brake-released position, the brake operation shaft 310 rotates about the axis line toward the brake-actuated position (counterclockwise direction in FIG. 3). If the speed-change lock mechanism 200 is in the speed-change locked state, the engaging portion 311 contacts the lock member 120 when the brake operation shaft 310 moves from the brake-released position to the brake-actuated position, whereby the lock member 210 moves from the locked position to the unlocked position, and the speed-change locked state of the speed-change lock mechanism 200 is released.

More specifically, the engaging portion 311 contacts the second arm portion 214 of the lock member 210 so that the lock member 210 rotates about the axis line (in the counterclockwise direction in FIG. 3) when the brake operation shaft 310 moves from the brake-released position to the brake-actuated position, whereby the lock member 210 moves from the locked position to the unlocked position so that the speed-change locked state of the speed-change lock mechanism 200 is released. As the lock member 210 moves to the unlocked position about the first pivot shaft 51, the lock member 210 moves away from the ratchet body 130 so that the speed-change locked state is released.

According to the travel operation device of the present embodiment, the speed-change lock mechanism 200 shifts from the speed-change locked state to the unlocked state when the brake operation mechanism 300 is operated, and thus the speed-change locked state of the speed-change lock mechanism 200 can be released by simply operating the brake operation mechanism 300 without arranging another operation mechanism separately from the brake operation mechanism 200.

Unlocking by Lock Operation Member

When the lock operation member 220 is manually operated to the unlocked position, the lock member 210 swings about the first pivot shaft 51 (in the counterclockwise direction in FIG. 3) so as to be positioned at the unlocked position. The engagement of the lock claw 211 of the lock member 210 with respect to the teeth 131 of the ratchet body 130 is thereby released, so that the pedal shaft 110 that is biased toward the neutral side is rotated about the axis line toward the neutral side, and the forward-side speed-change pedal 121 is returned to the neutral position therewith. The speed-change locked state of the speed-change lock mechanism 200 is thereby released.

Unlocking by the Forward-Side Speed-Change Pedal

When the forward-side speed-change pedal 121 is manually operated to move toward the forward side, the pedal shaft 110 rotates about the axis line toward the forward side (in the clockwise direction in FIG. 3), and the ratchet body 130 swings toward the forward side about the pedal shaft 110 therewith. At this time, since the lock member 210 is biased toward the unlocked position by the coil spring 230, the engagement of the lock claw 211 of the lock member 210 with respect to the teeth 131 of the ratchet body 130 is released by the rotation of the ratchet body 130 toward the forward side. When the manual operation toward the forward side on the forward-side speed-change pedal 121 is stopped in this state, the forward-side speed-change pedal 121 is returned to the neutral position. The speed-change locked state of the speed-change lock mechanism 200 is thereby released.

More specifically, the plurality of teeth 131 of the ratchet body 130 that is biased toward the neutral side are arranged along the virtual circular arc, the lock claw 211 of the first arm portion 213 is arranged along the tangential direction with respect to the virtual circular arc, and furthermore, the tooth-side second contacting surface 131b is arranged so as to be away from the tooth-side first contacting surface 131a as extending radially outward with the pedal shaft 110 as the reference. In the configuration, the tooth-side first contacting surface 131a moves away from the claw-side first contacting surface 211a as the forward-side speed-change pedal 121 moves from the neutral side toward the forward side. Therefore, the lock member 210 moves to the unlocked position about the first pivot shaft 51 (in the counterclockwise direction in FIG. 3) by the biasing force of the coil spring 230 or the pushing force against the claw-side second contacting surface 211b by the tooth-side second contacting surface 131b along with the biasing force of the coil spring 230, and moves away from the ratchet body 130. When the manual operation toward the forward side on the forward-side speed-change pedal 121 is stopped in this state, the forward-side speed-change pedal 121 is returned to the neutral position by the neutral biasing mechanism 140. The speed-change locked state of the speed-change lock mechanism 200 is thereby released. Since the teeth 131 and the lock claw 211 are configured to form a space S between the respective second contacting surfaces 131b, 211b when the respective first contacting surfaces 131a, 211a contact to each other, the claw-side first contacting surface 211a easily moves away from the tooth-side first contacting surface 131a when the engagement of the lock claw 211 of the lock member 210 with respect to the teeth 131 of the ratchet body 130 is released in a case where the speed-change locked state is released by the operation of the HST speed-change operation mechanism 100.

Figure 12:
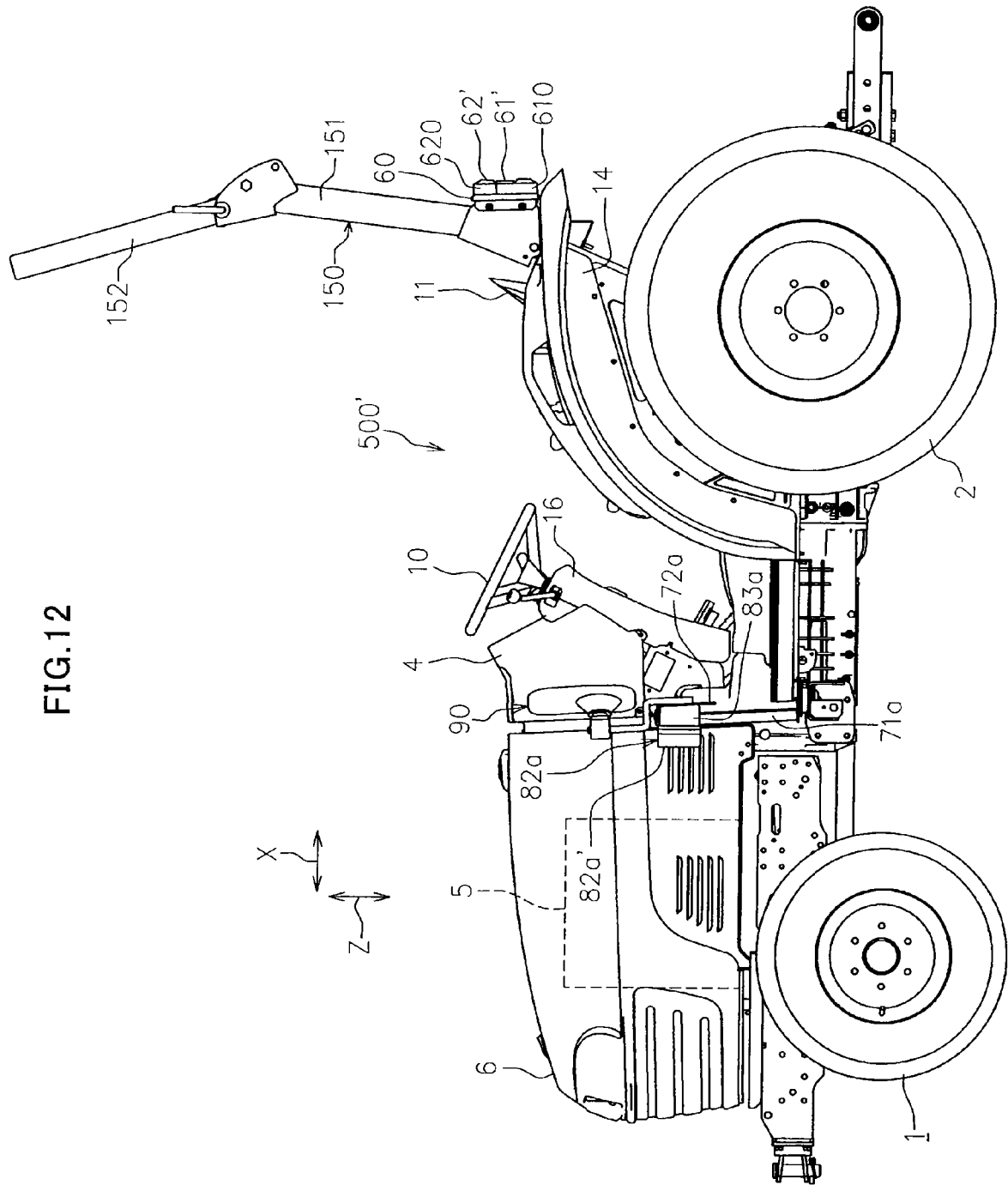
FIG. 12 is a schematic side view of a working vehicle according to a preferred embodiment of the present invention.
Figure 13:
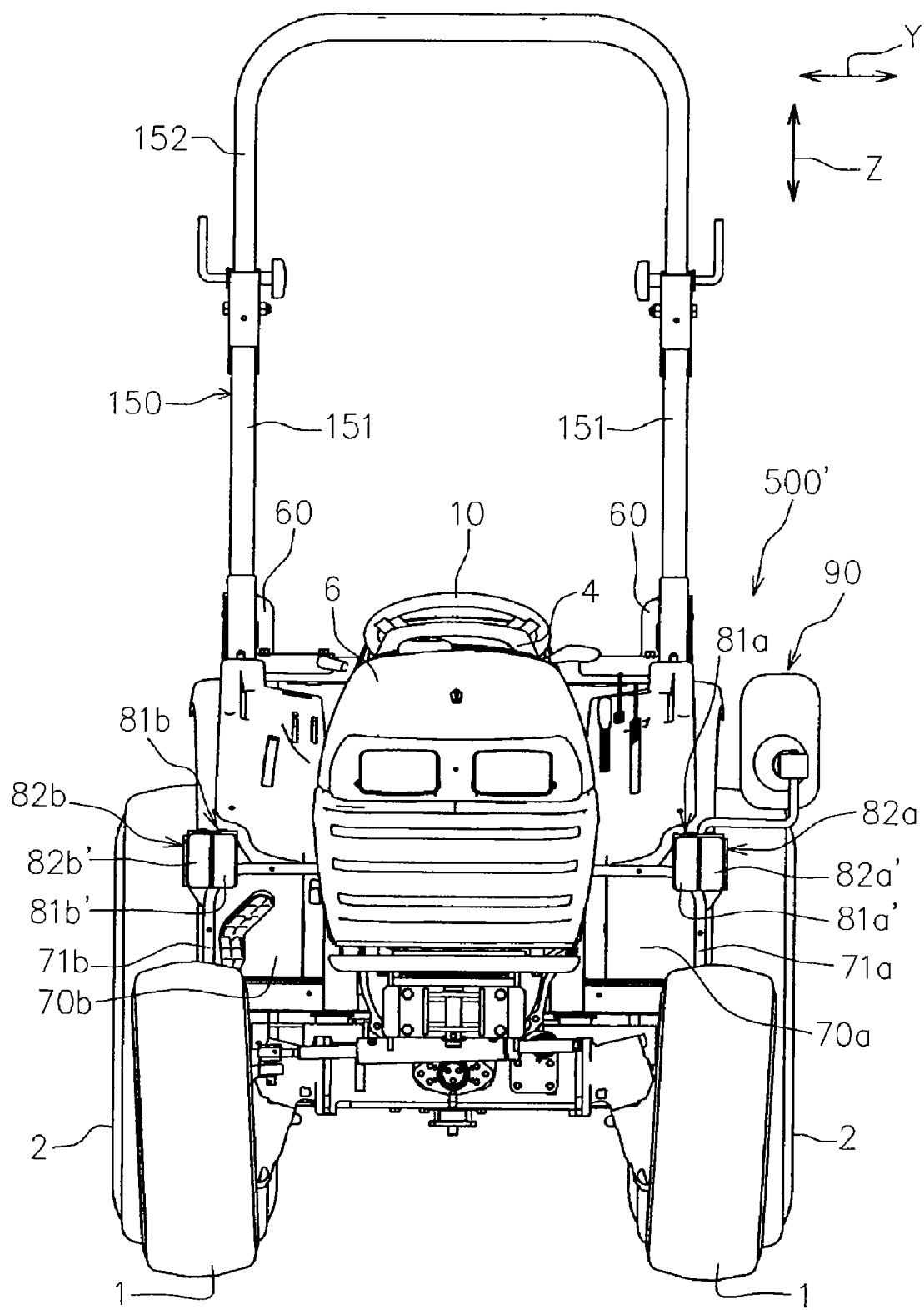
FIG. 13 is a schematic front view of the working vehicle shown in FIG. 12.
Figure 15:
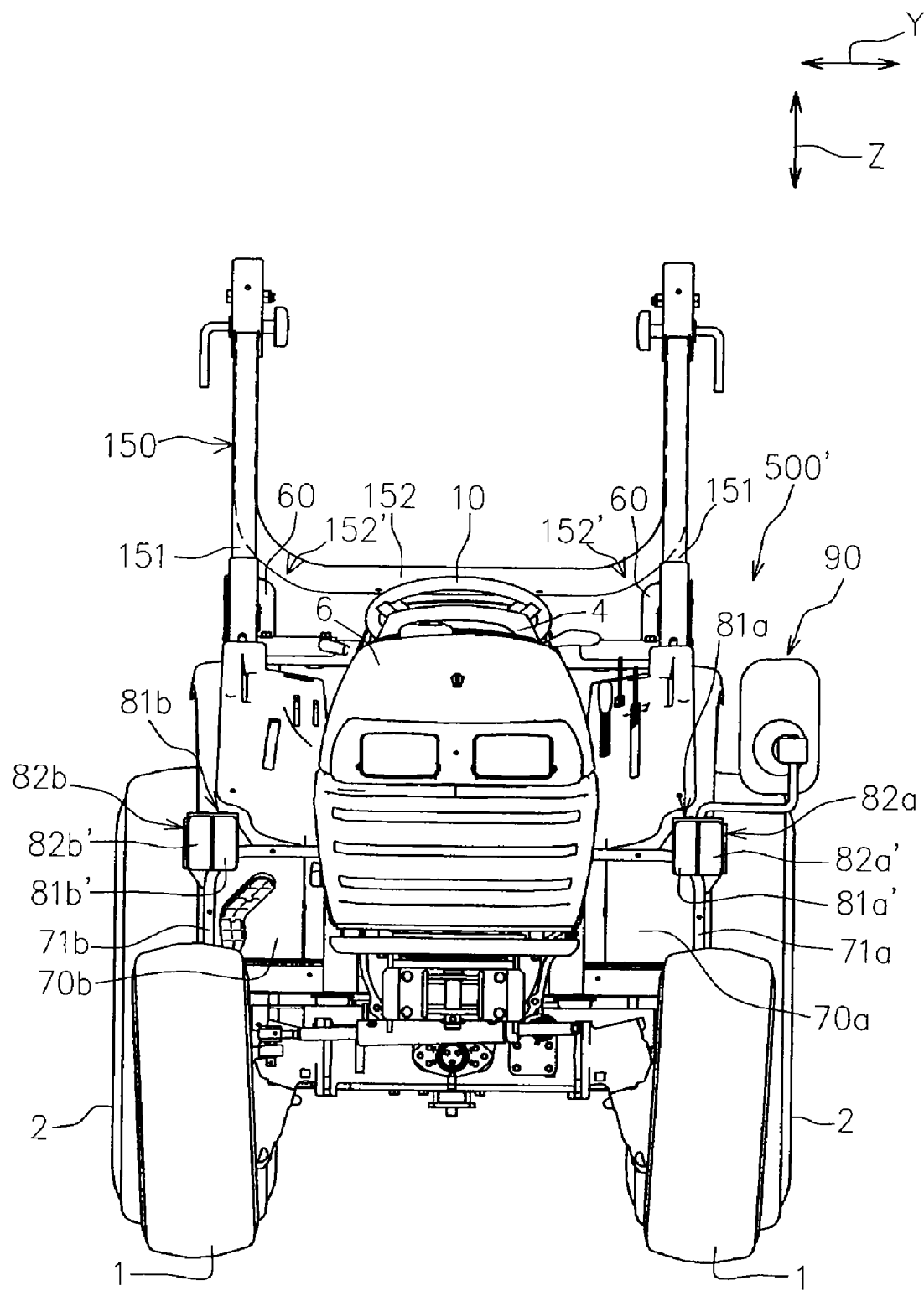
FIG. 15 is a schematic front view of the working vehicle shown in FIGS. 12-14 in a state where a safety frame is folded.

One example of the working vehicle according to the present invention will now be described. FIG. 12 is a schematic side view of the working vehicle 500' according to the present embodiment for achieving the third object, and FIG. 13 is a schematic front view of the vehicle. In FIGS. 12 and 13, and FIG. 15 that will be hereinafter described, the same reference characters are denoted for members having substantially the same functions as the working vehicle shown in FIGS. 1 and 2 described above.

The working vehicle 500' is a working vehicle (tractor in present example) of a so-called no-cabin type in which the driver's seat is exposed. The working vehicle 500' is configured so that the driving force from the engine 5 serving as the driving power source is transmitted to the pair of steered wheels and the pair of non-steered wheels respectively arranged on one side and the other side in the vehicle longitudinal direction (X direction in the drawing). In the present embodiment, the front wheels 1 are the steered wheels, and the rear wheels 2 are the non-steered wheels.

In the working vehicle 500', the front wheels 1 and the rear wheels 2 are respectively supported at the front and rear sides of the vehicle main body, and the engine 5 is arranged inside a bonnet 6 at the front side of the vehicle main body. A dashboard 4 is arranged on the rear side of the bonnet 6, a steering handle 10 is arranged on the dashboard 4, and a handle column 16 is arranged on the lower side of the steering handle 10 and a driver's seat 11 is arranged on the rear side of the steering handle 10. The operation members such as various operation levers are arranged on the dashboard 4 in the vicinity of the steering handle 10 or on a rear wheel fender 14 on the lateral side of the driver's seat 11.

The working vehicle 500' further includes a pair of left and right mud-shield foot-guards 70a, 70b arranged on the front side with the driver's seat 1 as the reference, and a pair of left and right foot-guard supporting members 71a, 71b for supporting the pair of left and right foot-guards 70a, 70b, respectively. In the working vehicle 500', width indicator lamps 81a, 81b and direction indicator lamps 82a, 82b are detachably mounted to at least one of the pair of left and right foot-guard supporting members 71a, 71b (both in the embodiment shown) in such a manner that light-emitting portion 81a', 81b' and 82a', 82b' thereof face the front side. Further, in the working vehicle 500', a rearview mirror 90 is detachably mounted to at least one of the pair of left and right foot-guard supporting members 71a, 71b (left foot-guard supporting member 71a in the embodiment shown) in a rotatable manner. The installation state of the width indicator lamps 81a, 81b and the direction indicator lamps 82a, 82b to the pair of left and right foot-guard supporting members 71a, 71b and the installation state of the rearview mirror 90 to the left foot-guard supporting member 71a will be further described below with reference to FIG. 14.

Figure 14:
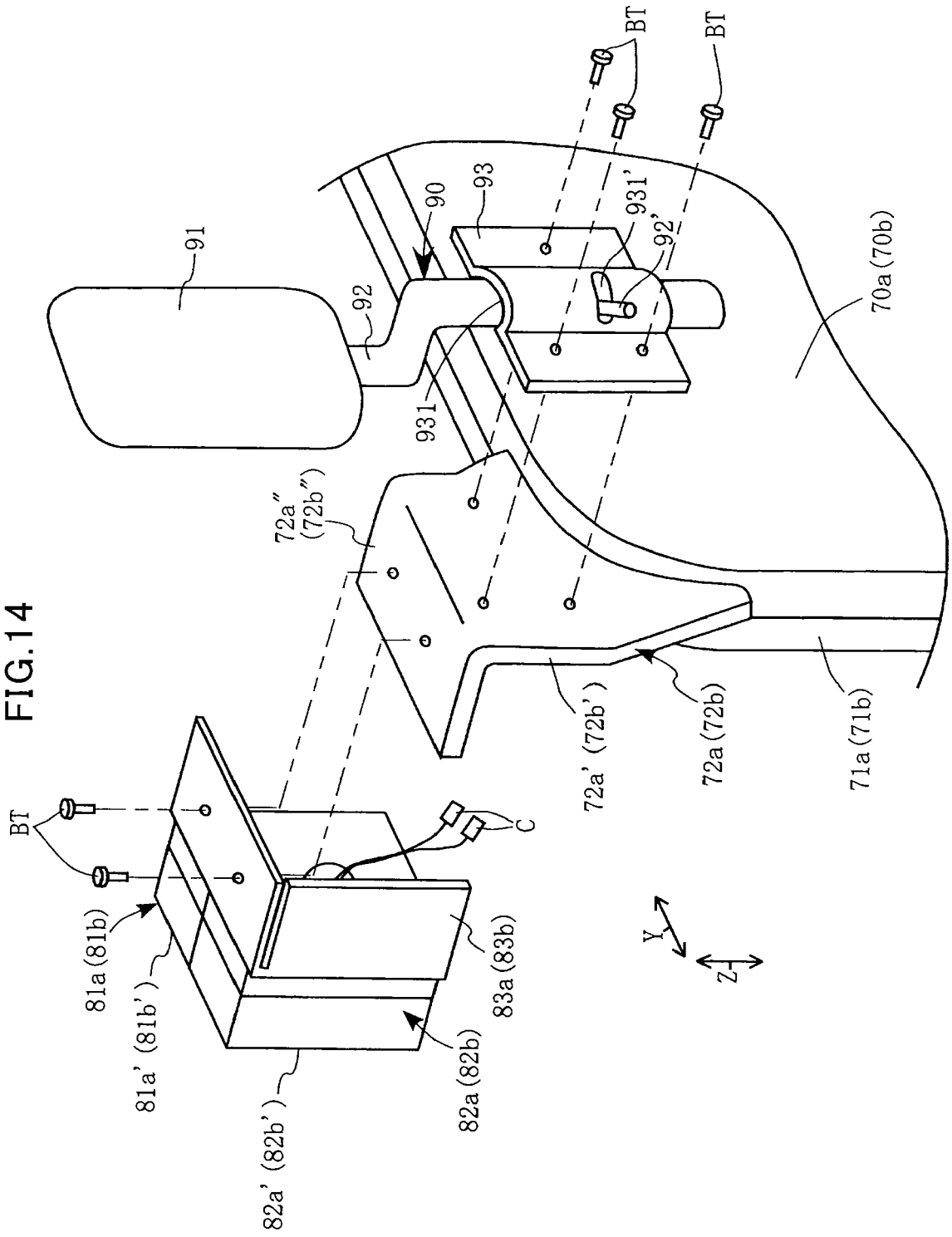
FIG. 14 is an exploded perspective view for explaining a state where a width indicator lamp and a direction indicator lamp are mounted to a left and right foot-guard supporting member, and a rearview mirror 90 is mounted to the left foot-guard supporting member.

FIG. 14 is an exploded perspective view for explaining a state of mounting the width indicator lamp 81a, the direction indicator lamp 82a, and the rearview mirror 90 to the left foot-guard supporting member 71. The mounting state of the width indicator lamp 81b and the direction indicator lamp 82b to the right foot-guard supporting member 71b is substantially the same other than being symmetrical with respect to the installation state shown in FIG. 14. Therefore, the corresponding reference characters are indicated in parentheses in FIG. 14 for the right foot-guard supporting member 71b, the width indicator lamp 81b, and the direction indicator lamp 82b.

As shown in FIG. 14, the foot-guard supporting member 71a(71b) integrally includes an attachment bracket 72a(72b) at the corner portion positioned on the upper side in the vertical direction (Z direction in the drawing) and on the outer side in the vehicle width direction (Y direction in the drawing), and the width indicator lamp 81a(81b) and the direction indicator lamp 82a(82b) are mounted to the attachment bracket 72a(72b). The attachment bracket 72a(72b) has an L-shaped cross section including an extending portion 72a' (72b') extending in the predetermined direction (substantially upward in the vertical direction Z in the embodiment shown) and a bent portion 72a"(72b") bent toward the front side at substantially right angle from the extending portion 72a' (72b'). The width indicator lamp 81a(81b) and the direction indicator lamp 82a(82b) are attached to the bent portion 72a" (72b"). Specifically, the width indicator lamp 81 a(81b) and the direction indicator lamp 82a(82b) are attached to the bent portion 72a" (72b") by way of a supporting member 83a (83b), which is fixed to the bent portion 72a" (72b") by bolts BT, so that the width indicator lamp 81a(81b) and the direction indicator lamp 82a(82b) are in parallel in a state where one of them (the width indicator lamp 81a(81b) in the embodiment shown) is arranged on the inner side in the vehicle width direction and the other of them (the direction indicator lamp 82a(82b) in the embodiment shown) is arranged on the outer side in the vehicle width direction. Connectors C of the width indicator lamp 81a(81b) and the direction indicator lamp 82a(82b) are connected to electronic connectors (not shown) for the width indicator lamp and the direction indicator lamp attached in the foot-guard supporting member 71a(71b).

The rearview mirror 90 includes a mirror portion 91, a mirror supporting member 92, and a mirror attachment member 93. The mirror supporting member 92 is formed by a rod-shaped member that has a portion extending in the predetermined direction (Z direction in the drawing), one bent portion bent at substantially right angle from the portion extending in the predetermined direction and the other bent portion at substantially right angle so as to again be directed along the predetermined direction Z. The mirror supporting member 92 supports the mirror portion 91 at one end and includes a projecting part 92' radially projecting from the side surface at the other end. The mirror attachment member 93 is a plate shaped member, and includes a concave part 931 extending in the predetermined direction Z so as to be formed along the outer peripheral surface of the mirror supporting member 92 at the center portion in the vehicle width direction vehicle. The concave part 931 is formed with an elongated hole 931' which extends in the circumferential direction of the mirror supporting member 92 and into which the projecting part 92' of the mirror supporting member 92 is engaged. The mirror supporting member 92 is mounted to the attachment bracket 72a in a detachable manner and in a rotatable manner by attaching the attachment member 93 to the extending portion 72a' of the attachment bracket 72a by bolts BT in a state where the concave part 931 covers the mirror supporting member 92 supporting the mirror portion 91 with the projecting part 927 being engaged into the elongated bole 931'.

According to the working vehicle 500' described above, since the width indicator lamps 81a, 81b and the direction indicator lamps 82a, 82b are mounted to the pair of left and right foot-guard supporting parts 71a, 71b arranged on the front side with the driver's seat 11 as the reference so that the light emitting portion 81a', 81b' and 82a', 82b' face forward, the third person, who sees the vehicle from the front side or from the lateral side with a distance, is able to visibly recognize the working vehicle 500' without the light from the width indicator lamps 81a, 81b and the direction indicator lamps 82a, 82b being shielded by the driver or the vehicle main body, whereby a satisfactory visibility of the third person with respect to the working vehicle 500' is obtained. Furthermore, since the width indicator lamps 81a, 81b and the direction indicator lamps 82a, 82b are mounted on the front side of the vehicle with the driver's seat 11 as the reference in a state where the light emitting portion 81a', 81b' and 82a', 82b' are arranged so as to face forward, the rearview view of the driver (e.g., view in a case where the driver steers the working vehicle 500' while looking rearward) becomes satisfactory. Furthermore, the light irradiated forward from the width indicator lamps 81a, 81b and the direction indicator lamps 82a, 82b is less likely to enter the eyes of the driver even if the driver is facing forward, and therefore, the forward view of the driver (view in a case where the driver steers the working vehicle 500' while looking forward) also becomes satisfactory. Moreover, since the width indicator lamps 81a, 81b and the direction indicator lamps 82a, 82b are detachably mounted, it is easy to adapt to the change of specification regarding the necessity of the width indicator lamps 81a, 81b and/or the direction indicator lamps 82a, 82b by mounting or removing the supporting members 83a, 83b that supports the width indicator lamps 81 a, 81b and the direction indicator lamps 82a, 82b to or from the attachment bracket 72a, 72b of the foot-guard supporting part 71a, 71b.

In addition, since the rearview mirror 90 is mounted to the left foot-guard supporting member 71a, an exclusive attachment member for attaching the rearview mirror 90 does not need to be separately arranged, which reduces the number of components and suppresses the cost to be low. Since the rearview mirror 90 is arranged in a rotatable manner at the left foot-guard supporting member 71a, it is possible to accommodate the rearview mirror 90 in a compact manner by turning the rearview mirror 90 so as not to project outward (specifically, so as not to be in the way during work such as mowing), thereby improving the workability, in particular of the work in a narrow space such as the work in a barn. The rearview mirror 90 is detachably mounted to the left foot-guard supporting member 71a, and thus can be easily reattached to either of the left and right foot-guard supporting members 71a, 71b.

Since the brackets 72a, 72b having an L-shaped cross section including the extending portion 72a', 72b' and the bent portion 72a", 72b" at the corner portion of the foot-guard supporting member 71a, 71b and the width indicator lamp 81a, 81b and the direction indicator lamp 82a, 82b are mounted at the bent portion 72a", 72b", the corner portion of the foot-guard supporting member 71a, 71b could be effectively reinforced. Furthermore, if the rearview mirror 90 is arranged at the extending portion 72a', it could be suppressed to transmit the vibration from the working vehicle 500' to the rearview mirror 90.

In the working vehicle 500', a pair of left and right rear width indicator lamp 610 and direction indicator lamp 620 may be arranged on the rear side with the driver's seat 11 as the reference in a state where the light emitting portion 61', 62' thereof face rearward, as shown in FIGS. 12 and 13. In the configuration shown in the drawings, a safety frame 150, which is arranged on the rear side with the driver's seat 11 as the reference, is provided with an attachment member 60, and the direction indicator lamp 620 and the width indicator lamp 610 are attached to the safety frame 150 by way of the attachment member 60 so as to be arranged one above the other. According to this configuration, the width indicator lamp 610 and the direction indicator lamp 620 emit light rearward from the rear position of the driver's seat 11, and thus the light from the rear width indicator lamp 610 and the rear direction indicator lamp 620 are less likely to enter the eyes of the driver even if the driver face rearward, and therefore, the rearward view of the driver becomes satisfactory. The safety frame 150 is provided to protect the driver when the working vehicle 500' falls over. Specifically, the safety frame 150 includes a first safety frame 151 to which the rear width indicator lamp 610 and the rear direction indicator lamp 620 are attached, and a second safety frame 152 connected to the first safety frame 151 in a retractable manner about the axis line along the vehicle width direction. The second safety frame 152 is extended upward and fixed to take the extending posture in a time of working, and is folded to a side of the width indicator lamp 610 and the direction indicator lamp 620 (rear side of the vehicle) in a time of not working. The distance from the pivot point at one end of the second safety frame 152 to the other end may be made substantially equal to the distance from the pivot point at one end of the first safety frame 151 to the other end so that the safety frame 150 in the folded state does not project above the working vehicle 500' as much as possible when the second safety frame 152 is folded with respect to the first safety frame 151. In the configuration, a corner portion 152' of the second safety frame 152 may be curved and formed into a circular arc shape, as shown in FIG. 15, so that the second safety frame 152 does not interfere with the width indicator lamp 610 and the direction indicator lamp 620 when folded. According to such configuration, when the safety frame 150 is in the folded state, the safety frame 150 is made compact so as not to project above the working vehicle 500' as much as possible while the second safety frame 152 does not interfere with the width indicator lamp 610 and the direction indicator lamp 620.

Figure 16:
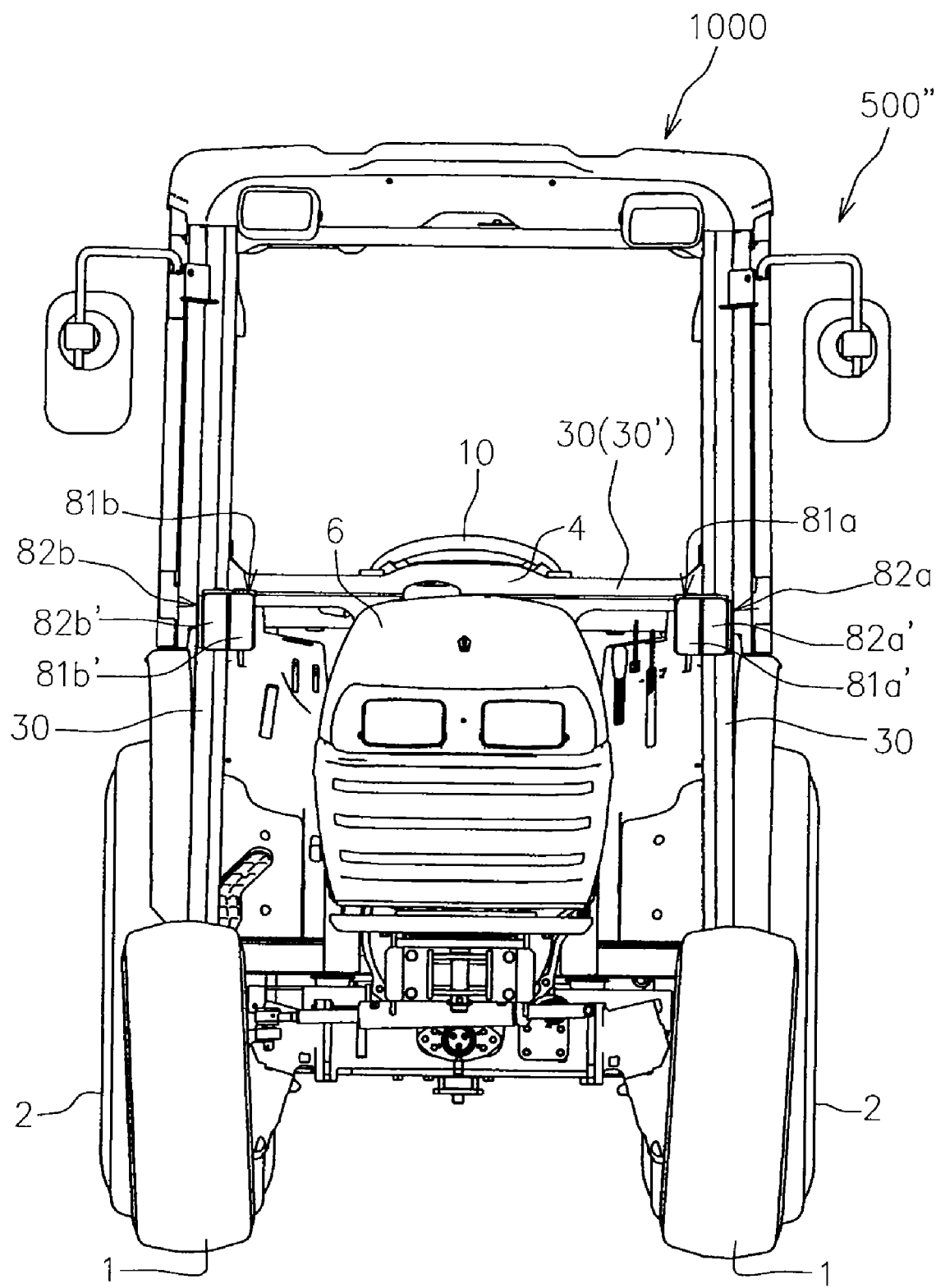
FIG. 16 is a schematic front view of a working vehicle including a cabin enclosing vicinity of a driver's seat, the working vehicle in which the width indicator lamp and the direction indicator lamp are arranged.
Figure 17:
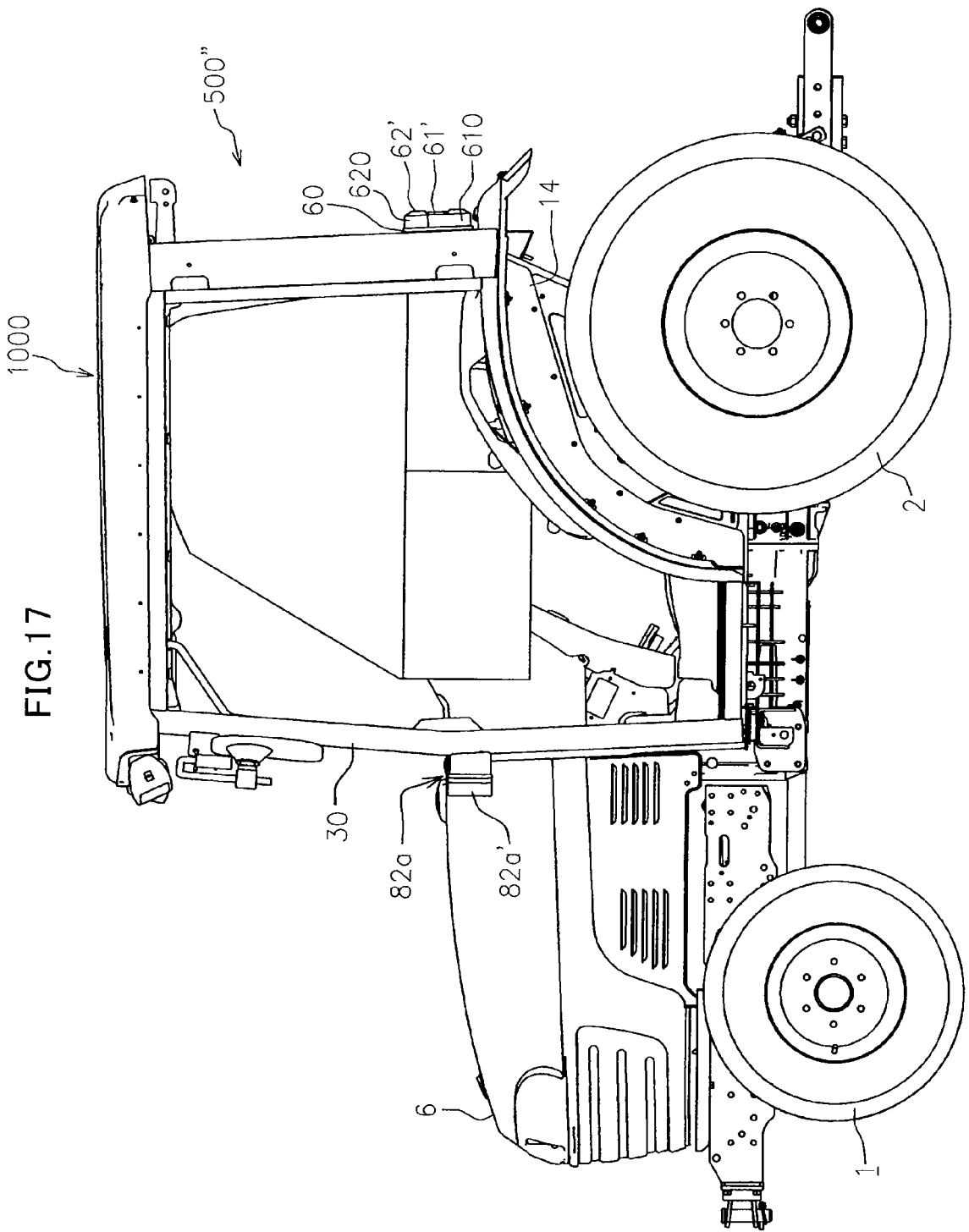
FIG. 17 is a schematic side view of the working vehicle shown in FIG. 16.

An embodiment where the direction indicator lamp and the width indicator lamp are provided in a so-called no-cabin type working vehicle in which the driver's seat is exposed has been described in the present embodiment, and another embodiment where the direction indicator lamp and the width indicator lamp are mounted to a so-called cabin type working vehicle including a cabin 1000 enclosing the periphery of the driver's seat as shown in FIGS. 16 and 17 will also be described below.

FIGS. 16 and 17 show schematic side view and schematic front view, respectively, of the working vehicle 500" which includes the cabin 1000 enclosing the periphery of the driver's seat and to which the width indicator lamps 81a, 81b and the direction indicator lamps 82a, 82b are provided. In FIGS. 16 and 17, the same reference characters are denoted for some of the members substantially the same as the working vehicle 500' shown in FIGS. 12 to 14.

In the working vehicle 500", the width indicator lamps 81a, 81b and the direction indicator lamps 82a, 82b are detachably mounted to the left and right cabin frames 30 (both ends of an air cut plate 30' of a traverse frame in the embodiment shown) so that the light emitting portion 81a', 81b' and 82a', 82b' face forward. The attachment of the width indicator lamps 81a, 81b and the direction indicator lamps 82a, 82b to the air cut plate 30' uses the attachment brackets 72a, 72b, similar to the attachment of the width indicator lamps 81a, 81b and the direction indicator lamps 82a, 82b to the foot-guard supporting members 71a, 71b, and thus the detailed description on the attachment configuration is not given here. The rigidity of the air but plate 30' could be enhanced by attaching the width indicator lamps 81a, 81b and the direction indicator lamps 82a, 82b to the air cut plate 30' by using the attachment brackets 72a, 27b. The attachment bracket may be arranged to left and right cabin frames 30 so as to project in the vehicle width direction, and the rearview mirror may be arranged in a rotatable manner and/or in a detachable manner, as shown in FIG. 14.

What is claimed is:
1. A traveling operation device comprising:
a speed-change operation mechanism for operating a stepless speed-change device, the speed-change operation mechanism being biased toward a neutral side;
a speed-change lock mechanism capable of being manually operated so as to take a speed-change locked state of holding the speed-change operation mechanism at a voluntary speed-change position and an unlocked state of releasing the speed-change locked state; and
a brake operation mechanism for operating a traveling brake device;

wherein
the speed-change lock mechanism shifts from the speed-change locked state to the unlocked state according to the operation of the brake operation mechanism,
wherein the speed-change operation mechanism includes:
a speed-change pedal shaft capable of being rotated about an axis line;
a forward-side speed-change pedal that is relatively non-rotatable with respect to the pedal shaft, the forward-side speed-change pedal rotating the pedal shaft about the axis line based on a manual operation;
a ratchet body that rotates about the axis line substantially parallel to the pedal shaft according to the rotation of the pedal shaft about the axis line, the ratchet body including a plurality of teeth; and
a neutral biasing mechanism for operatively biasing the pedal shaft toward the neutral side;
the speed-change lock mechanism includes:
a lock member including a lock claw that selectively engages the plurality of teeth of the ratchet body, the lock member capable of being rotated about a first pivot shaft substantially parallel to the pedal shaft so as to take a locked position where the lock claw engages the teeth and an unlocked position where the lock claw is separate from the teeth;
a lock operation member capable of being manually operated so as to position the lock member at the locked position or the unlocked position; and
an unlock biasing member for operatively holding the lock member at the unlocked position;
the brake operation mechanism includes:
a brake operation shaft arranged substantially parallel to the first pivot shaft, the brake operation shaft capable of being rotated about the axis line to take a brake-actuated position of actuating the traveling brake device and a brake-released position of releasing the brake actuation of the traveling brake device;
a brake operation member capable of being manually operated so as to selectively position the brake operation shaft at the brake-actuated position or the brake-released position; and
a brake-releasing biasing member for operatively biasing the brake operation shaft toward the brake-released position; and
the brake operation shaft includes an engaging portion that contacts the lock member to move the lock member from the locked position to the unlocked position when the brake operation shaft moves from the brake-released position to the brake-actuated position.

2. The traveling operation device according to claim 1, wherein
the lock member includes a center portion supported by the first pivot shaft in a rotatable manner about the axis line, and a first arm portion extending from the center portion toward the ratchet body and including the lock claw,
the plurality of teeth are arranged along a virtual circular arc having the pedal shaft as a center when seen along the axis line of the pedal shaft, and
the first arm portion lies along a tangential direction with respect to the virtual circular arc.

3. The traveling operation device according to claim 2, wherein
the lock member includes a second arm portion extending toward a side opposite the first arm portion with the center portion in between; and
the engaging portion of the brake operation shaft is configured to engage the second arm portion.

4. The traveling operation device according to claim 2, wherein
the tooth of the ratchet body includes a tooth-side first contacting surface that contacts the lock claw when the ratchet body is biased toward the neutral side by a biasing force of the neutral biasing mechanism, and a tooth-side second contacting surface that contacts the lock claw when the ratchet body is rotated toward an forward side against the biasing force of the neutral biasing mechanism by the manual operation on the forward-side speed-change pedal;
the lock claw includes a claw-side first contacting surface and a claw-side second contacting surface respectively corresponding to the tooth-side first contacting surface and the tooth-side second contacting surface of the tooth of the ratchet body;
the tooth-side first contacting surface lies in a radial direction with the pedal shaft as a reference; and
the tooth-side second contacting surface is arranged so as to be away from the first contacting surface a extending radially outward with the pedal shaft as the reference.

5. The traveling operation device according to claim 4, wherein the teeth and the lock claw form a space between the respective second contacting surfaces when the respective first contacting surfaces contact with each other.

6. The traveling operation device according to claim 1, wherein
the neutral biasing mechanism includes:
a neutral-setting pushing member capable of being rotated about a second pivot shaft substantially parallel to the first pivot shaft, the neutral-setting pushing member including a cam surface in a concave shape when seen along an axis line direction of the second pivot shaft;
a neutral-setting driven member capable of being rotated about a third pivot shaft substantially parallel to the second pivot shaft, the neutral-setting driven member including a cam follower portion that engages the cam surface; and
a neutral-setting biasing member for biasing the neutral-setting pushing member so that the cam surface is pushed against the cam follower portion;
the neutral-setting driven member is operatively connected to the ratchet body so as to rotate about the third pivot shaft in conjunction with a rotation of the ratchet body about the pedal shaft, and
the cam follower portion engages a deepest part of the cam surface when the speed operation mechanism for operating the stepless speed-change device is in a neutral state.

7. The traveling operation device according to claim 6, wherein
the neutral biasing mechanism further includes a base member that supports the neutral-setting pushing member in a rotatable manner about the second pivot shaft and supports the neutral-setting driven member in a rotatable manner about the third pivot shaft, and
the base member is coupled to a member configuring a vehicle frame in a positioning-adjustable manner.

8. The traveling operation device according to claim 1, wherein
the speed-change operation mechanism further includes a rearward-side speed-change pedal that is relatively non-rotatable with respect to the pedal shaft, the rearward-side speed-change pedal rotating the pedal shaft about the axis line based on a manual operation, and
the pedal shaft rotates to one side and the other side about the axis line based on the operation of the forward-side speed-change pedal and the rearward-side speed-change pedal, respectively.

* * * * *